(12) United States Patent
Hisada et al.

(10) Patent No.: US 7,822,548 B2
(45) Date of Patent: Oct. 26, 2010

(54) NAVIGATION APPARATUS, VEHICLE LENDING SYSTEM, AND VEHICLE LENDING METHOD

(75) Inventors: Ikunori Hisada, Shijonawate (JP); Hiroshi Nakashima, Hirakata (JP); Yoji Ogawa, Kobe (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 614 days.

(21) Appl. No.: 11/752,485

(22) Filed: May 23, 2007

(65) Prior Publication Data

US 2007/0276585 A1 Nov. 29, 2007

(30) Foreign Application Priority Data

May 26, 2006 (JP) .............................. 2006-146113

(51) Int. Cl.
*G01C 21/30* (2006.01)
*G08G 1/123* (2006.01)
(52) U.S. Cl. ....................... 701/211; 701/209; 701/200; 340/995.23; 340/995.24
(58) Field of Classification Search ................. 701/209, 701/211; 340/995.23, 995.24
See application file for complete search history.

(56) References Cited

U.S. PATENT DOCUMENTS

| | | | | |
|---|---|---|---|---|
| 5,964,821 | A * | 10/1999 | Brunts et al. ................. | 701/201 |
| 6,360,167 | B1 * | 3/2002 | Millington et al. .......... | 701/211 |
| 6,405,126 | B1 * | 6/2002 | Palomo et al. ............... | 701/202 |
| 7,493,210 | B2 * | 2/2009 | Nassiff et al. ................ | 701/207 |
| 2003/0023371 | A1 * | 1/2003 | Stephens ..................... | 701/209 |
| 2003/0093216 | A1 * | 5/2003 | Akiyama ..................... | 701/200 |
| 2003/0182052 | A1 * | 9/2003 | DeLorme et al. ............ | 701/201 |
| 2007/0255493 | A1 * | 11/2007 | Ayoub et al. ................ | 701/211 |

FOREIGN PATENT DOCUMENTS

JP  2001-108451 A  4/2001
JP  2002-99961 A  4/2002

* cited by examiner

*Primary Examiner*—Khoi Tran
*Assistant Examiner*—Ian Jen
(74) *Attorney, Agent, or Firm*—Westerman, Hattori, Daniels & Adrian, LLP

(57) ABSTRACT

A navigation apparatus of the invention includes a display portion that displays a guidance screen and a removably installed recording medium, the navigation apparatus being provided in a vehicle and guiding the vehicle along a guidance path. When candidate site data created in an external apparatus has been stored on the storage medium, a screen for selectively setting the end point of the guidance path based on the candidate site data is displayed in the display portion, and when setting the end point, a guidance path that arrives at the end point is calculated. The candidate site data includes information related to one or a plurality of locations that have been designated in advance by a user of the navigation apparatus, and the end point is selected from the one or plurality of locations.

10 Claims, 28 Drawing Sheets

F I G. 4

| ID NO. | LATITUDE | LONGITUDE | NAME | ADDRESS | TELEPHONE NUMBER | CATEGORY | AFFILIATION | COMMENTS | IMAGE FILE PATH | AUDIO FILE PATH |
|---|---|---|---|---|---|---|---|---|---|---|
| ... | ... | ... | ... | ... | ... | ... | ... | ... | ... | ... |
| 11111 | 35.36.41 | 139.45.31 | DEF HOTEL | ...TOKYO | 03-4444-5555 | HOTEL | NO | DEF HOTEL IS... | C:¥PICT¥... | C:¥VOICE¥... |
| ... | ... | ... | ... | ... | ... | ... | ... | ... | ... | ... |
| 11123 | 35.38.21 | 139.47.43 | STU PARK | ...TOKYO | 03-3333-4444 | SIGHTSEEING | NO | STU PARK IS... | C:¥PICT¥... | C:¥VOICE¥... |
| 11124 | 35.38.44 | 139.48.45 | AAA HOSPITAL | ...TOKYO | 03-2222-3333 | HOSPITAL | NO | | | |
| 11125 | 35.38.35 | 139.49.00 | JJJ RESTAURANT | ...TOKYO | 03-1111-2222 | RESTAURANT | YES | JJJ RESTAURANT IS... | C:¥PICT¥... | |
| ... | ... | ... | ... | ... | ... | ... | ... | ... | ... | ... |
| 11222 | 35.40.41 | 139.52.6 | GHI LAND | ...TOKYO | 03-9999-1111 | SIGHTSEEING | NO | GHI LAND IS... | C:¥PICT¥... | C:¥VOICE¥... |
| ... | ... | ... | ... | ... | ... | ... | ... | ... | ... | ... |

FIG. 8

RENTAL CAR RESERVATION INQUIRY

·DEPARTURE DATE AND TIME

YEAR [2006 ▼] MONTH [5 ▼] DATE [10 ▼]

HOUR [12 ▼] MINUTE [00 ▼]

·RETURN DATE AND TIME

YEAR [2006 ▼] MONTH [5 ▼] DATE [13 ▼]

HOUR [17 ▼] MINUTE [30 ▼]

·STORE

[ABC STATION STORE ▼]

·VEHICLE TYPE

[XYZ ▼]

( TRANSMIT )

FIG. 9

USER INFORMATION INPUT

・NAME

ICHIRO SUZUKI

・SEX

● MALE    ○ FEMALE

・AGE

31 ▼  YEARS

・ADDRESS

OSAKA ▼

1-1 SANYO-CHO, DAITO-SHI

・TELEPHONE NUMBER 072-123-4567

・MEMBERSHIP NUMBER

1234567

・PURPOSE OF USE

SIGHTSEEING ▼

MAKE RESERVATION

FIG. 10

A RESERVATION WAS MADE WITH THE INFORMATION BELOW.

YOUR RESERVATION NUMBER IS 01234.

| | |
|---|---|
| ・NAME | ICHIRO SUZUKI |
| ・SEX | MALE |
| ・AGE | 31 YEARS |
| ・ADDRESS | 1-1 SANYO-CHO, DAITO-SHI, OSAKA |
| ・TELEPHONE NUMBER | 072-123-4567 |
| ・MEMBERSHIP NUMBER | 1234567 |
| ・PURPOSE OF USE | SIGHTSEEING |
| ・DEPARTURE DATE AND TIME | MAY 10, 2006, 12:00 P.M. |
| ・RETURN DATE AND TIME | MAY 13, 2006, 5:30 P.M. |
| ・STORE | ABC STATION STORE |
| ・VEHICLE TYPE | XYZ |

[ END ]   [ SET LOCATION INFORMATION ]

FIG. 11

LOCATION INFORMATION INPUT

<DESTINATION>
- NAME: DEF HOTEL
- ADDRESS: [▼] [ ]
- TELEPHONE NUMBER: [ ]

<FIRST WAYPOINT>
- NAME: GHI LAND
- ADDRESS: [▼] [ ]
- TELEPHONE NUMBER: [ ]

<SECOND WAYPOINT>
- NAME: [ ]
- ADDRESS: [▼] [ ]
- TELEPHONE NUMBER: 03-8888-2222

<THIRD WAYPOINT>
- NAME: [ ]
- ADDRESS: TOKYO [▼] 1 KASUMIGASEKI, CHIYODA-KU
- TELEPHONE NUMBER: [ ]

( TRANSMIT )

FIG. 15

PLEASE INPUT YOUR RESERVATION NUMBER

| 1 | 2 | 3 | 4 | 5 | 6 | 7 | 8 | 9 | 0 |

CANCEL   ENTER   CLEAR

FIG. 16

HELLO, ICHIRO SUZUKI.
TODAY IS MAY 10, 2006.

F I G. 2 6
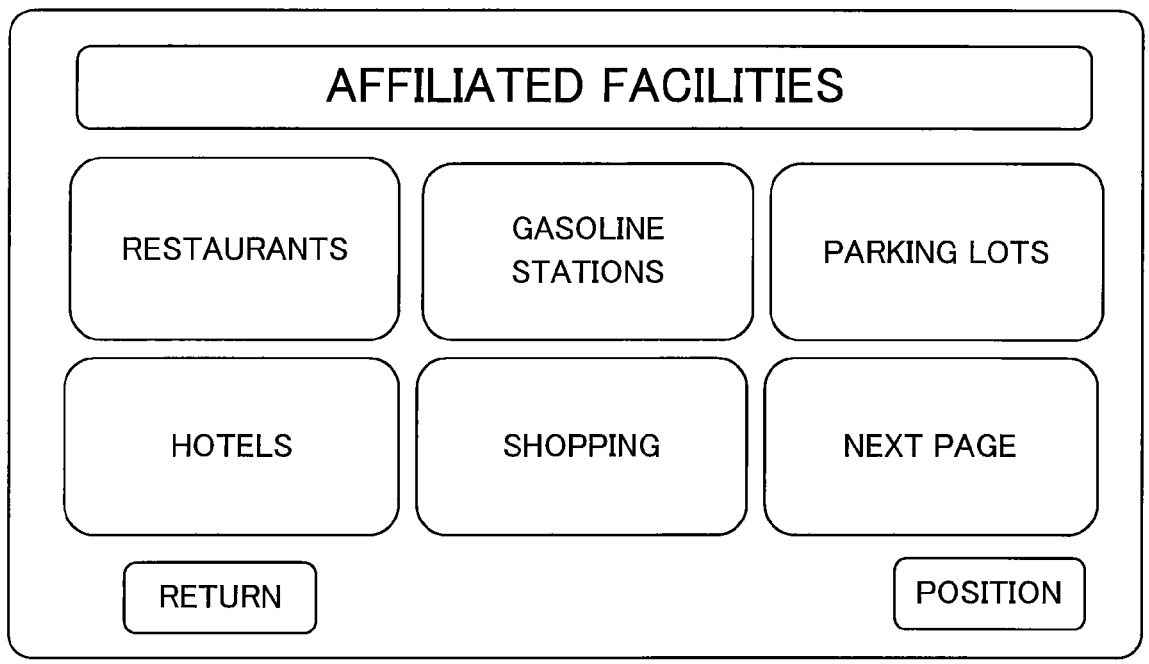

NAVIGATION APPARATUS, VEHICLE LENDING SYSTEM, AND VEHICLE LENDING METHOD

FIELD OF THE INVENTION

The present invention relates to a navigation apparatus installed in a vehicle, and also to a vehicle lending system for lending a vehicle provided with a navigation apparatus, and a method for lending such a vehicle.

BACKGROUND OF THE INVENTION

In an ordinary vehicle navigation apparatus, when search conditions for a destination or waypoint (for example, a name or address) are input, setting of the end point of a guidance path or route is performed by referring to a database related to various facilities, sightseeing sites, and the like. Then, a path search is performed, a guidance path from the present location of the vehicle to the end point is determined, and a guidance screen for guiding the vehicle along the determined guidance path is displayed based on map data. The guidance screen includes a map in which the present location of the vehicle, the guidance path, and the like are indicated, and is appropriately updated in response to vehicle movement.

The map data and the database are recorded on a recording medium such as a DVD, a hard disk, or the like. Due to a change in road conditions, an increase or decrease in facilities, or the like, it becomes necessary to update the map data and the database in order for the navigation apparatus to operate effectively. With respect to easily updating map data and the like, for example, in JP 2001-108451A a navigation apparatus is disclosed that, via the internet, communicates with a server apparatus that manages map data and supplemental information. This navigation apparatus records the map data and the supplemental information obtained from the server apparatus to a nonvolatile memory such as a flash memory.

A user that uses a rental car for sightseeing or business often drives the rental car in an area the user does not know well. Installation of a navigation apparatus in a rental car is very productive for realizing convenient driving for such a user. For example, in JP 2002-99961A, a car rental system including a navigation apparatus capable of connection to a network, a hotel terminal and a rental car vendor terminal connected to the network is disclosed. In this system, the user accesses the hotel terminal via the network to make a hotel reservation. After receiving notification of that reservation from the hotel terminal, the rental car vendor terminal makes settings in the navigation apparatus via the network such as a guidance path from the location of the rental car vendor and an area in which movement is possible.

At present, many types of navigation apparatuses exist, and operating procedures, the form of screens displayed during operation, the arrangement and shape of operating keys, and the like differ according to the type of navigation apparatus. In most cases, a user who has borrowed a rental car equipped with a navigation apparatus from a rental car vendor likely uses a navigation apparatus of a type they have not yet used, not a navigation apparatus installed in a vehicle that they themselves own. Also, a user who has borrowed a rental car equipped with a navigation apparatus may not have experience using a navigation apparatus.

In the above sort of case, the user operates the navigation apparatus installed in the rental car with reference to a user's manual to perform setting of their desired destination or the like. However, this sort of activity is very burdensome to a user of a rental car engaged in sightseeing or business for limited time. The rental car vendor may make settings in the navigation apparatus before the user departs, but this is meaningless when the destination has been changed or when the rental car is rented for a long period of time.

In the car rental system described in JP 2002-99961A, the guidance path sent from the server apparatus is set in the navigation apparatus, so the burden on the user with respect to operation is likely reduced. However, in this sort of system, the burden of operation is lightened only in a case in which the user travels from the rental car vendor's store to the destination, without taking any detours.

In a case in which the hotel in which the user will stay is the final destination, even if a guidance path from the rental car vendor's store to the hotel is provided, a guidance path directed directly to the destination is nearly meaningless to a user that uses the rental car for business or sightseeing. Even assuming that the guidance path has been set in consideration of waypoints that the user has designated in advance, when the vehicle has deviated from the guidance path for the user to have meals, perform fueling, or the like, circumstances can arise in which it is more effective to newly search for a guidance path using the present location of the vehicle as a start point than to return to the original guidance path. Circumstances can also arise in which the user's plans are changed due to the schedule of a business counterpart or conditions at a sightseeing site, so that the user does not travel to the waypoints as designated. Unforeseen circumstances can also arise in which a fellow passenger suddenly becomes ill, and the user drives the vehicle toward a hospital that is not designated as a waypoint. Thus, it is thought that even when using the car rental system described in JP 2002-99961A, the burden of operating a navigation apparatus is not reduced for an ordinary user using a rental car for business or sightseeing.

SUMMARY OF THE INVENTION

The present invention was made in order to address the problems described above, and it is an object thereof to, in a navigation apparatus installed in a vehicle such as a rental car used by the general pubic, greatly reduce the burden on a user, and in particular to reduce the burden on a user when setting the end point of a guidance path.

The invention provides a navigation apparatus comprising a display portion that displays a guidance screen and a removably installed recording medium, the navigation apparatus being provided in a vehicle and guiding the vehicle along a guidance path; wherein when candidate site data created by an external apparatus is stored on the recording medium, a screen for selectively setting an end point of the guidance path is displayed in the display portion based on the candidate site data, when the end point is set, a guidance path that arrives at the end point is calculated, and the candidate site data includes information related to one or a plurality of locations that are designated in advance before the recording medium is installed, and the end point is selected from the one or a plurality of locations.

In the navigation apparatus of the invention, it is preferable that the candidate site data is created in the external apparatus by searching for content stored in a database related to locations, using as conditions one or a plurality of items that are input to a terminal communicably connected to the external apparatus and designate the one or a plurality of locations.

In the navigation apparatus of the invention, it is preferable that the external apparatus is capable of transmitting the candidate site data to a terminal that is communicably connected to the external apparatus, the recording medium being removably installed in the terminal, and the candidate site data is stored on the recording medium using this terminal.

In the navigation apparatus of the invention, it is preferable that the candidate site data further includes information related to one or a plurality of related locations that satisfy a predetermined positional relationship with the one or a plurality of locations, and the end point is selected from the one or a plurality of locations and the one or a plurality of related locations.

In the navigation apparatus of the invention, it is preferable that the candidate site data includes information related to a classification for each of the one or a plurality of related locations, and in the display portion, the one or a plurality of related locations are shown differentiated according to those classifications.

The invention provides a vehicle lending system including a user terminal used by a user that desires lending of a vehicle, a server apparatus that receives an application for lending of the vehicle sent from the user terminal, a store terminal disposed in a store that will lend the vehicle, and a navigation apparatus installed in the vehicle, the user terminal and the server apparatus being communicably connected to each other, the server apparatus and the store terminal being communicably connected to each other, and a recording medium being removably installed in the store terminal and the navigation apparatus; wherein the user terminal transmits to the server apparatus, in addition to the application for lending of the vehicle, one or a plurality of items input to the user terminal and related to one or a plurality of locations, the server apparatus creates candidate site data that the navigation apparatus refers to in order to identify the one or a plurality of locations based on the one or a plurality of items, and transmits the candidate site data to the store terminal, and the navigation apparatus, when the recording medium in a state storing the candidate site data has been installed, displays a screen for selectively setting an end point of a guidance path from the one or a plurality of locations.

The invention provides a vehicle lending method of lending a vehicle in which a navigation apparatus has been installed to a user, the method including a step of receiving an application for lending of the vehicle sent from a terminal, the application received in a server apparatus communicably connected to the terminal; a step of, when the server apparatus has received, in addition to the application, one or a plurality of items input to the user terminal and related to one or a plurality of locations, creating candidate site data that the navigation apparatus refers to in order to identify the one or a plurality of locations based on the one or a plurality of items, the candidate site data being created in the server apparatus; a step of transmitting the candidate site data created in the server apparatus to a terminal disposed in a store where the vehicle will be lent and communicably connected to the server apparatus; a step of storing the candidate site data received by the store terminal in the navigation apparatus; and a step of allowing the user to, in the navigation apparatus, selectively set an end point of a guidance path from the one or a plurality of locations based on the candidate site data.

In the vehicle lending system and the vehicle lending method of the invention, it is preferable that the server apparatus obtains one or a plurality of related locations that satisfy a predetermined positional relationship with the one or a plurality of locations, and creates the candidate site data so as to include the one or a plurality of related locations in addition to the one or a plurality of locations, and in the navigation apparatus, the end point is selected from the one or a plurality of locations and the one or a plurality of related locations.

According to the invention, when, for example, an application for lending of a vehicle is made using the Internet or the like, the user is allowed to designate in advance locations such as a destination or waypoints, and by providing information of these locations that become candidates for the end point of a guidance path to the navigation apparatus, the user can easily and promptly select the end point of the guidance path by selecting from these locations. Even if the user does not have experience using the navigation apparatus installed in the vehicle, the user can use the navigation apparatus without referring to a manual or the like. Also, by allowing the navigation apparatus to possess information related to one or a plurality of related locations that satisfy a predetermined positional relationship with one or a plurality of locations that have been designated, it is possible to simply set a related location such as a sightseeing site, a restaurant, a hospital, or a gasoline station near a destination or a waypoint as the end point of the guidance path. Further, by displaying the related locations differentiated according to their classification, the user can quickly find facilities, sightseeing sites, or the like according to the user's purpose.

Also, with the invention, based on items that the user has input to a terminal in order to designate a location such as a destination, an external apparatus, more specifically a server apparatus, creates candidate site data, and so the amount of data possessed by the navigation apparatus for searching for a destination or the like is reduced.

BRIEF DESCRIPTION OF THE DRAWINGS

In order to easily understand and implement the invention, the invention is described along with the below attached drawings with the object of describing but not limiting the invention.

FIG. 4 is an explanatory diagram conceptually showing a location information database provided by the server apparatus;

FIG. 8 is an explanatory diagram showing an example of a rental car reservation inquiry page displayed in the user terminal;

FIG. 9 is an explanatory diagram showing an example of a user information input page displayed in the user terminal;

FIG. 10 is an explanatory diagram showing an example of reservation complete notification page displayed in the user terminal;

FIG. 11 is an explanatory diagram showing an example of a location information input page displayed in the user terminal;

FIG. 15 is an explanatory diagram showing an example of a reservation number input screen displayed by the navigation apparatus;

FIG. 16 is an explanatory diagram showing an example of an initial screen displayed by the navigation apparatus;

FIG. 26 is an explanatory diagram showing an example of an affiliated facility category selection screen displayed by the navigation apparatus;

DESCRIPTION OF THE PREFERRED EMBODIMENTS

Figure 1:
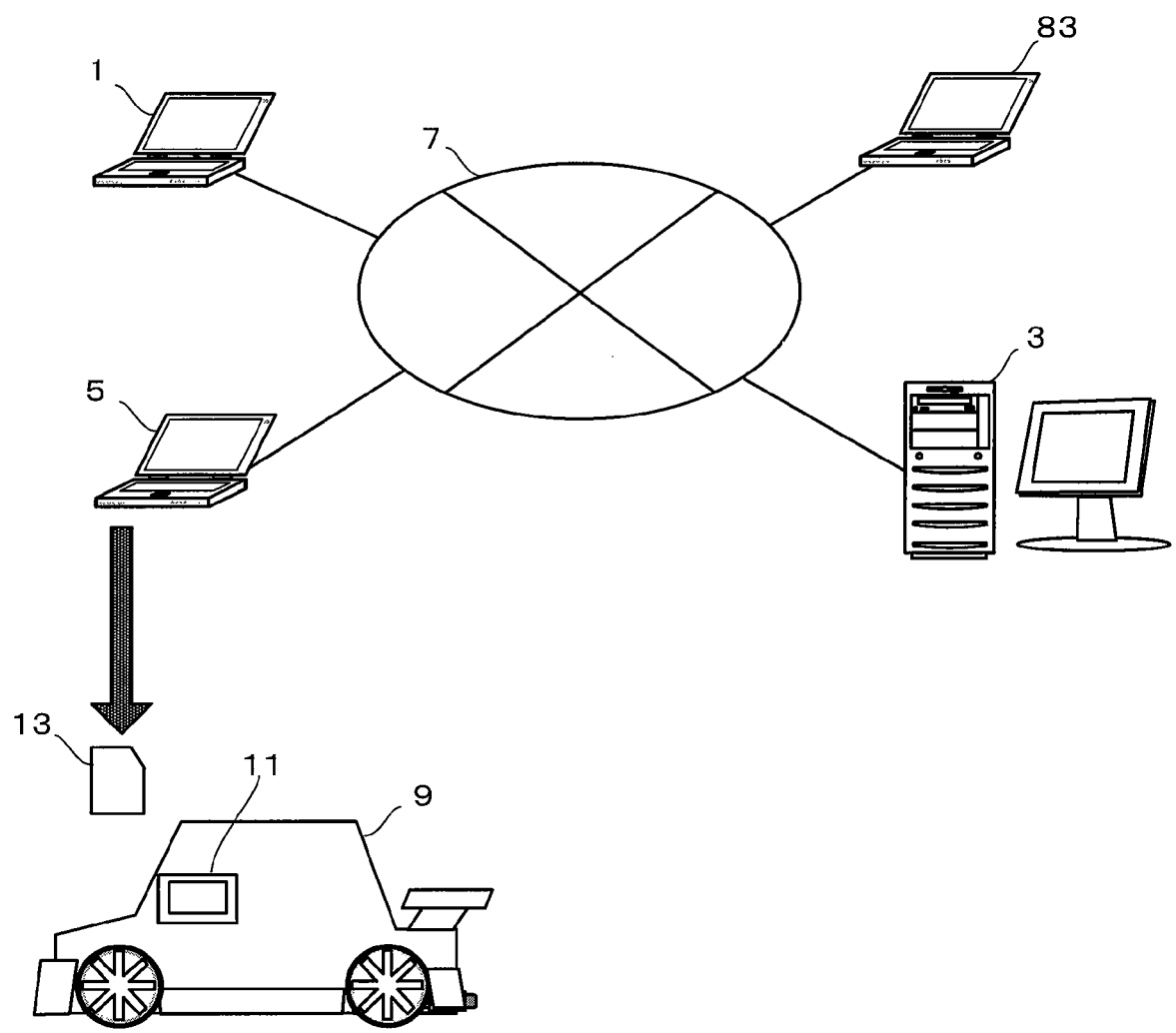
FIG. 1 is an explanatory diagram showing an overview of a vehicle lending system that is an embodiment of the invention.

Hereinafter, an example of the present invention will be described in detail with reference to the accompanying drawings. FIG. 1 is an explanatory diagram showing an overview of a vehicle lending system that is an embodiment of the invention. The vehicle lending system includes a user terminal 1 used by a user that borrows a rental car, a server apparatus 3 that is managed by a rental car vendor and receives rental car lending reservations for a plurality of stores deployed by a rental car vendor, and a store terminal 5 disposed at each of these stores. The user terminal 1, the server apparatus 3, and the store terminal 5 are connected to a communications network 7 that has been configured using the Internet, a LAN, a telephone network, or the like, and are capable of communicating with each other. The form of the communications network 7 is not particularly limited as long as the object of the invention is attainable; for example, the user terminal 1 and the server apparatus 3 may be connected using the Internet, a telephone network and the like, and the server apparatus 3 and the store terminal 5 connected with a dedicated line. Also, the user terminal 1 and the store terminal 5 may be incapable of communicating with each other. In FIG. 1, one user terminal 1 and one store terminal 5 are shown, but the number of the user terminals 1 and the number of the store terminals 5 are not particularly limited, and ordinarily, it is likely that many of the terminals 1 and 5 are present.

A user that makes a rental car reservation with a rental car vendor accesses the server apparatus 3 using the user terminal 1, and applies for lending of a vehicle by designating essential items such as the date and time, store, and vehicle type (the user terminal 1 may also be operated not by the user but by a person related to the user, for example a member of the user's family). When making the application, in addition to these essential items, the user can input location information related to a destination, waypoints, or the like. Here, the destination is the location to which the user plans to go using the rental car, and the waypoints include locations that the user plans to visit in the course of arriving at the destination. The server apparatus 3 receives the application of the user and manages the reservation, and notifies the store terminal 5 of a store possessing a rental car 9 borrowed by the user that a reservation was made. A recording medium 13 on which map data has been stored is removably installed in a navigation apparatus 11 installed in the rental car 9. The navigation apparatus 11 becomes operable by, at the store, the user that has reserved the rental car 9 receiving the recording medium 13, and installing it in the navigation apparatus 11.

When the location information has been input, the server apparatus 3 specifies locations based on the location information, and further, performs processing that selects locations related to the specified locations. The results of processing are transmitted to the store terminal 5 along with the reservation notification as user data. In the store terminal 5, the recording medium 13 is removably installable, and the user data received is stored by the recording medium 13 in the store terminal 5. By way of example, a memory card employing a rewritable nonvolatile semiconductor memory (for example, an SD card (registered trademark)) is used for the recording medium 13. By referring to the user data of the recording medium 13, setting of the end point of the guidance path is performed with a very simple operation in the navigation apparatus 11. This is described in detail below.

Figure 2:
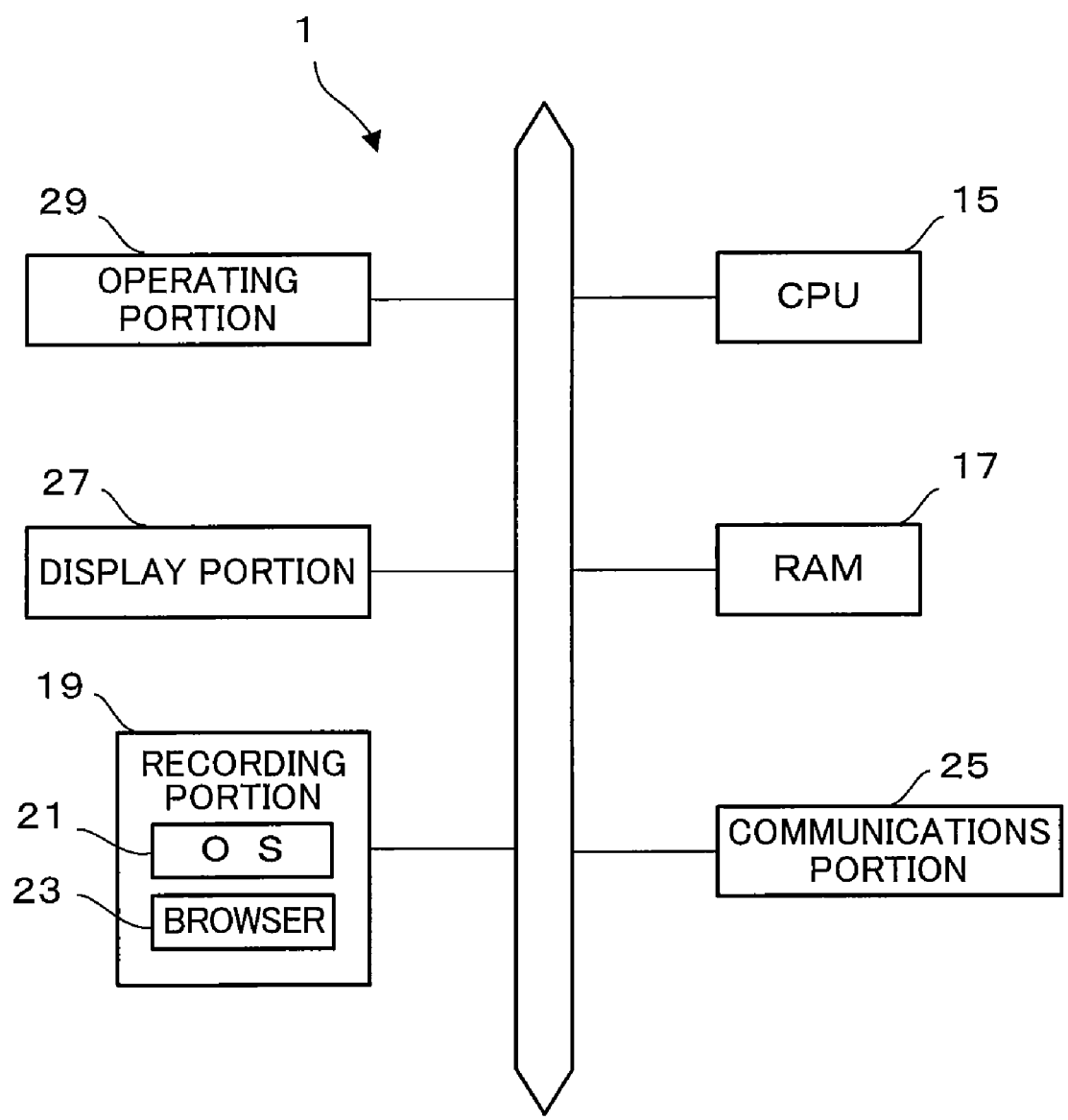
FIG. 2 is a block diagram showing the configuration of a user terminal included in the vehicle lending system of the invention.

FIG. 2 is a block diagram showing the configuration of the user terminal 1. The user terminal 1 is for example an ordinarily used personal computer, and includes a CPU 15 that runs or executes various computational processes, a RAM 17 used as a work area of the CPU 15, and a recording portion 19 that stores various programs run by the CPU 15. By way of example, a hard disk apparatus is used for the recording portion 19, and stored in the recording portion 19 are programs of an operating system 21 for controlling the user terminal 1, a Web browser 23 that is run when the user makes a rental car reservation, and the like. A communications portion 25 is configured from a network card, a modem, or the like for connecting to the communications network 7. By way of example, a liquid crystal display apparatus is used for a display portion 27, and a keyboard and a mouse are used for an operating portion 29.

Figure 3:
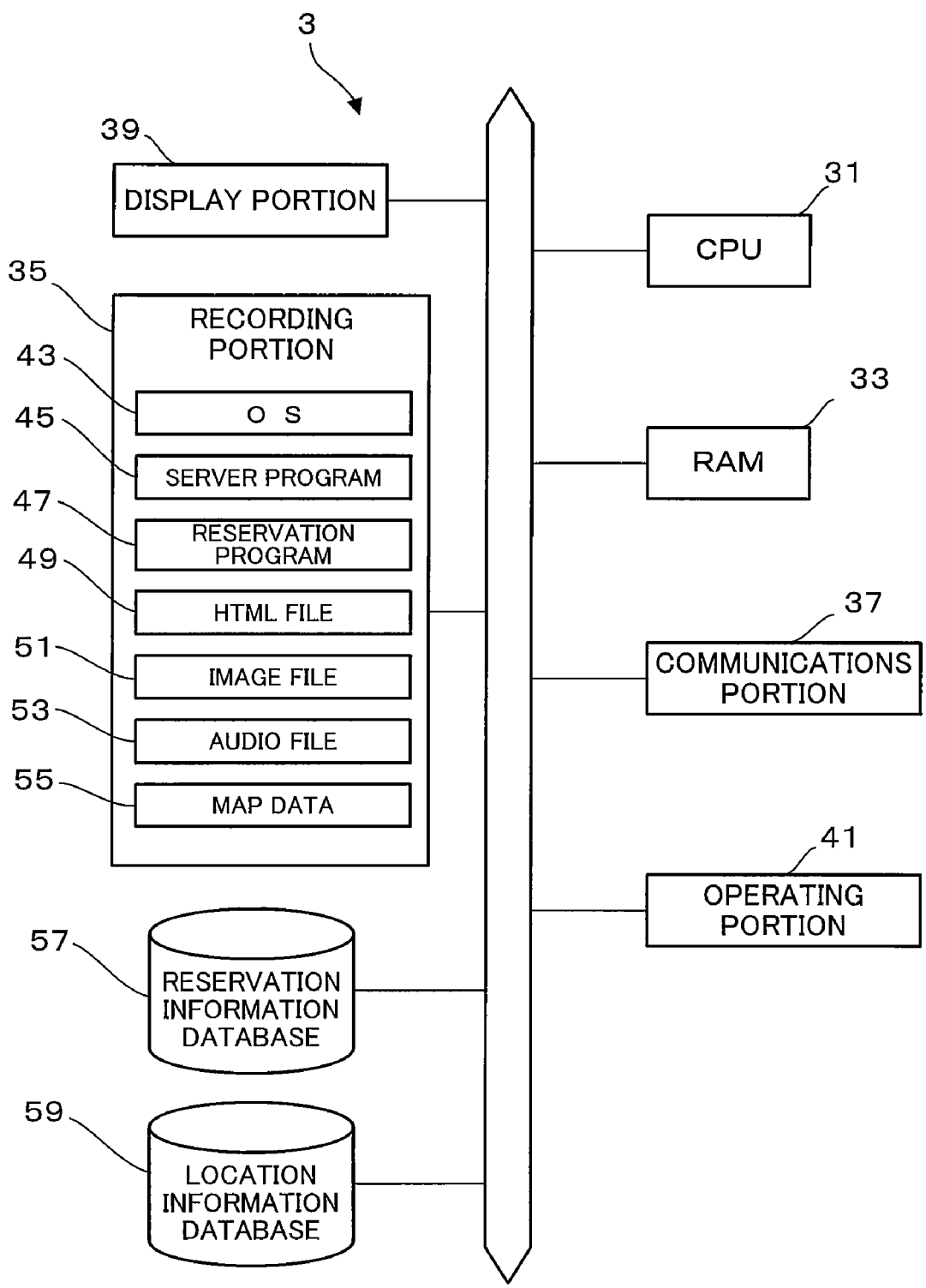
FIG. 3 is a block diagram showing the configuration of a server apparatus included in the vehicle lending system of the invention.

FIG. 3 is a block diagram showing the configuration of the server apparatus 3. The server apparatus 3, like the user terminal 1, includes a CPU 31, a RAM 33, a recording portion 35, a communications portion 37, a display portion 39, and an operating portion 41. Stored in the recording portion 35 are, in addition to an operating system 43, programs and data used in order to receive and process rental car reservations. A server program 45 is a program that allows the server apparatus 3 to function as a WWW (World Wide Web) server. Due to the server program 45 being run, the server apparatus 3, in response to a request sent from the user terminal 1, transmits an HTML (HyperText Markup Language) file, a Cookie for session management, or the like. A reservation program 47, for example, is a CGI (Common Gateway Interface) program in which various processes in rental car lending via the communications network 7 are described. Due to the reservation program 47 being run, the server apparatus 3, in addition to referring to a database described below to dynamically create an HTML file, performs database rewriting, judgment of whether a reservation can be made, creation of user data, and the like. Also stored in the recording portion 35 are a HTML file 49, an image file 51 linked to a static or dynamic HTML file, and an audio file 53. Further stored in the recording portion 35 is map data 55 referred to when the user data is created. It should also be noted that in FIG. 3, one HTML file 49, image file 51, and audio file 53 are shown, but a plurality of HTML files 49, image files 51, and audio files 53 are stored in the recording portion 35.

The server apparatus 3 is further provided with a reservation information database 57 and a location information database 59. Stored in the reservation information database 57 is store information related to each store of the rental car vendor (such as store name and address), information about rental cars in the possession of each store, information about the reservation status (and usage status) of these rental cars, and various information related to reservations that the rental car vendor has presently received. The location information database 59 is referred to when the user data is created by the reservation program 47. Stored in the location information database 59 is information related to sightseeing sites (including sightseeing facilities), public facilities (for example, hospitals and police stations), hotels, restaurants, gasoline stations, and other facilities, including position (latitude and longitude), name, and address.

FIG. 4 is an explanatory diagram conceptually showing the location information database 59. Included in the items stored in the location information database 59 are ID number, latitude (north latitude), longitude (east longitude), name, address, telephone number, category, (presence or absence of affiliation, comments, image file path, and audio file path. The ID number is a number uniquely assigned to a location recorded in the location information database 59. The name, address, and telephone number are, respectively, the name, address, and telephone number of a sightseeing site or facility. The category is a classification of the recorded location. The affiliation indicates whether or not the recorded location (facility) has a business affiliation with the rental car vendor. The comments, for example, are an introduction or promotional message related to the recorded location. The image file path, when the image file 51 showing an exterior view of the recorded location is in the recording portion 35, is a path that specifies that image file 51. The audio file path, when the audio file 53 introducing the recorded location is in the recording portion 35, is a path that specifies that audio file 53. In the location information database 59, with respect to each of the recorded locations, it is not necessary that there be an entry for all of the items. Also, the items stored in the location information database 59 with respect to each of the recorded locations may be only the ID number, address, and latitude and longitude.

Figure 5:
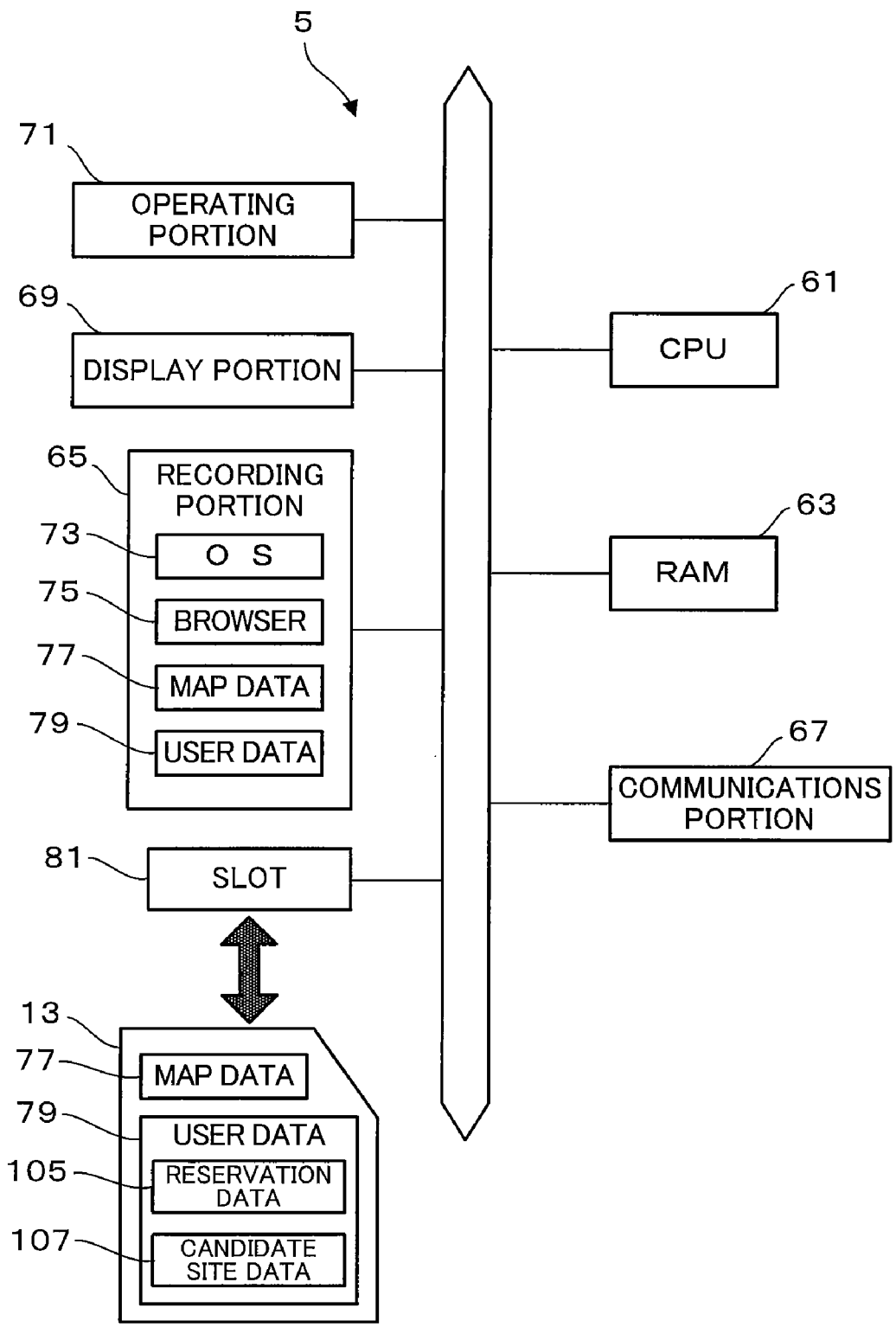
FIG. 5 is a block diagram showing the configuration of a store terminal included in the vehicle lending system of the invention.

FIG. 5 is a block diagram showing the configuration of the store terminal 5. The store terminal 5, like the user terminal 1, is provided with a CPU 61, a RAM 63, a recording portion 65, a communications portion 67, a display portion 69, and an operating portion 71. Stored in the recording portion 65 are an operating system 73, a Web browser 75, and map data 77. Also stored in the recording portion 65 is user data 79 sent from the server apparatus 3. (The user data 79 is stored for each person making a reservation.) Also provided in the store terminal 5 is a slot 81 in which the recording medium 13 is removably installed. When a user who has reserved the rental car 9 visits the store, an operator of the store terminal 5 installs the recording medium 13 in the slot 81, and copies the user data 79 related to that user to the recording medium 13. Afterward, the operator removes the recording medium 13 from the slot 81 and hands it over to the user. The user installs the received recording medium 13 in the navigation apparatus 11.

The map data 77 is data used in the navigation apparatus 11, and is always recorded in the recording portion 65 and on the recording medium 13. For example, when the map data 77 of the recording medium 13 is updated or has been corrupted, the map data 77 of the recording portion 65 of the store terminal 5 is copied to the recording medium 13.

It is possible that a customer that has not made a reservation will visit the store and desire reservation or lending of a rental car. In this case, the operator of the store terminal 5 accesses the server apparatus 3 from the store terminal 5 by running the Web browser 75, and makes arrangements for a reservation or lending by designating the date and time, store, vehicle type, and the like, and also the location information. That is, the store terminal 5 can function in the same manner as the user terminal 1.

The user can also make a rental car reservation and designate location information via a telephone. A telephone operator terminal 83 having a configuration like the user terminal 1 is connected to the communications network 7. Via telephone, a user informs a telephone operator of a date and time, store, vehicle type, location information, and the like, and these are input to the telephone operator terminal 83 by the telephone operator and sent to the server apparatus 3. When the size of the rental car vendor is small, a server apparatus 3 and a store terminal 5 connected to each other via a LAN may be disposed together in the store.

Figure 6:
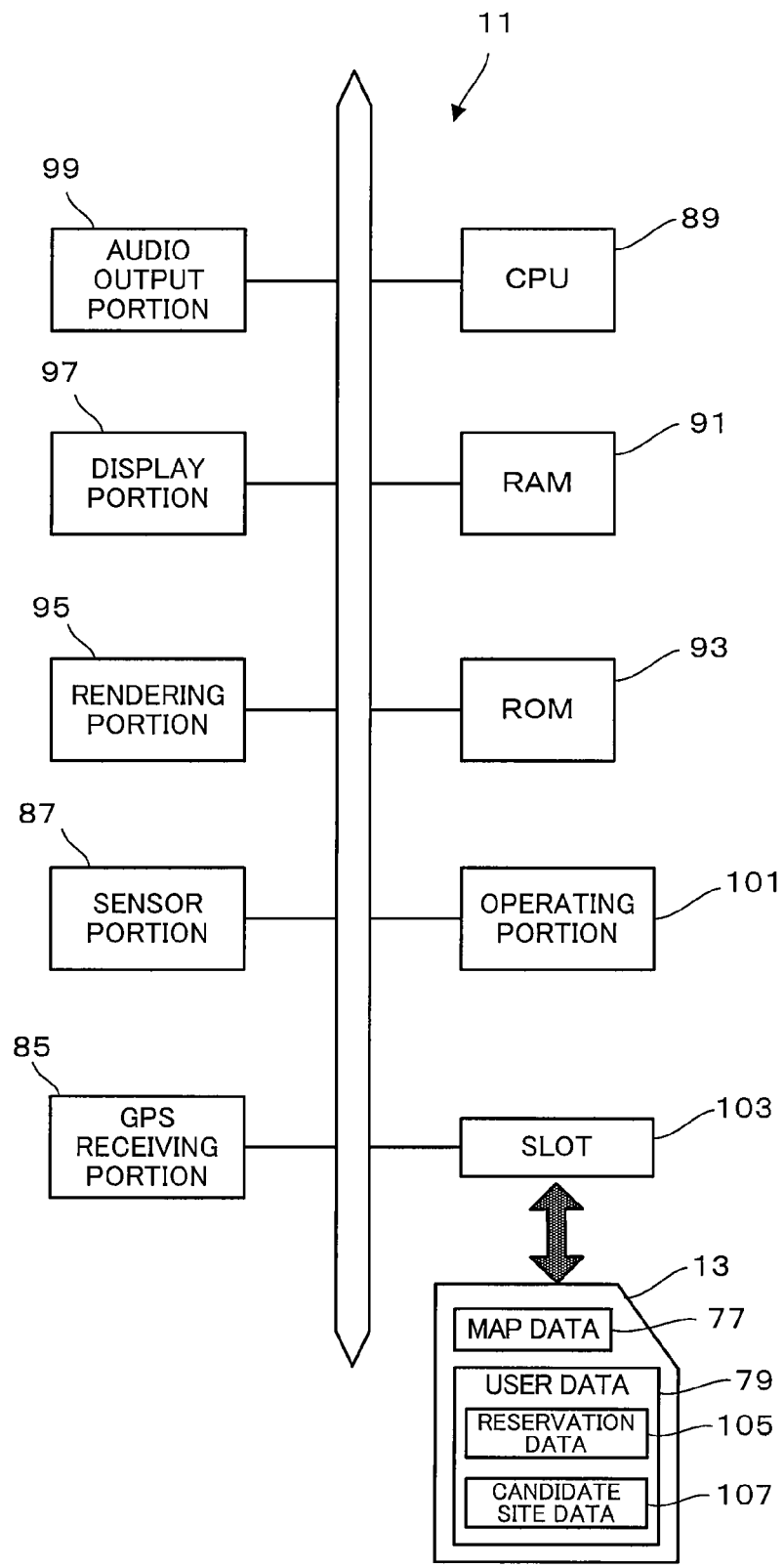
FIG. 6 is a block diagram showing the configuration of a navigation apparatus included in the vehicle lending system of the invention.
Figure 14:
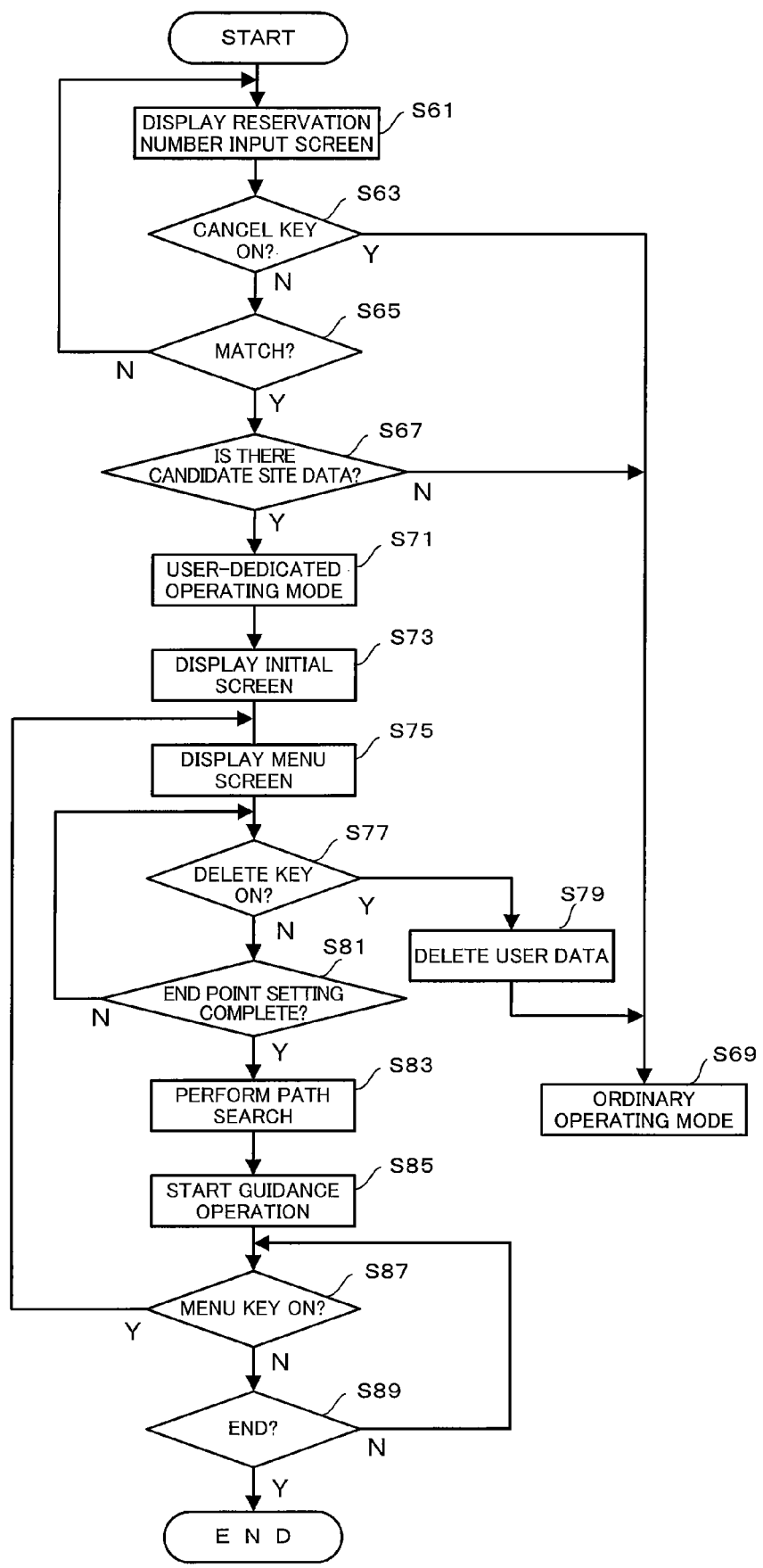
FIG. 14 is a flowchart showing the operation of the navigation apparatus.

FIG. 6 is a block diagram showing the configuration of a navigation apparatus 11. A GPS receiving portion 85 receives signals emitted from GPS satellites via an antenna (not shown), and identifies the present position of the vehicle. A sensor portion 87 includes a gyrosensor that identifies the bearing of the vehicle and a vehicle speed sensor that measures the speed of the vehicle. A CPU 89 executes various programs, and performs various processes necessary for control of the navigation apparatus 11 and for guiding the vehicle. A RAM 91 is used as a work space of the CPU 89. The ROM 93 stores, in addition to various programs including a program in which a process described below with reference to FIG. 14 is described, various data including icon image data and font data used to display guidance screens. A rendering portion 95 is for example a graphic IC, and creates image data of various screens described below based on instructions from the CPU 89. The display portion 97 is for example a liquid crystal display apparatus, and displays images based on the image data created by the rendering portion 95. An audio output portion 99 includes an amplifier and speaker, and emits guidance audio matched to the progress of the vehicle that instructs, for example, to turn right or turn left at an intersection. An operating portion 101 includes hard keys such as a power key, and a touch panel disposed on the display area of the display portion 97. The touch panel and an operating screen displayed in the display portion 97 are combined, and in a GUI (Graphical User Interface) of the navigation apparatus 11, various soft keys described below (for example, a key 201 in FIG. 17) are configured.

A slot 103 in which the recording medium 13 is removably installed is provided in the navigation apparatus 11. The map data 77 stored on the recording medium 13 includes node and link information that describes roads, information related to various facilities included in a physical range that is the subject of the map data 77, and other map information. The map data 77 is used when, for example, the CPU 89 executes a path search, or when the rendering portion 95 creates guidance screen image data.

The user data 79 includes reservation data 105 that includes items related to the reservation such as a user name and reservation number. Further, the user data 79 includes candidate site data 107 related to one or a plurality of locations designated by the user (specifically, a destination and/or waypoints), and locations that satisfy a predetermined positional relationship with the designated locations (for example, facilities or sightseeing sites). When the user did not designate either a destination or a waypoint when making the reservation, the candidate site data 107 is not included in the user data 79. When the user installs the recording medium 13 in the navigation apparatus 11 and presses the power key, the presence or absence of the candidate site data 107 is judged. When the candidate site data 107 is present, the navigation apparatus 11 operates in a user-dedicated mode, and setting of the end point of the guidance path is simply performed by referring to the candidate site data 107.

Figure 7:
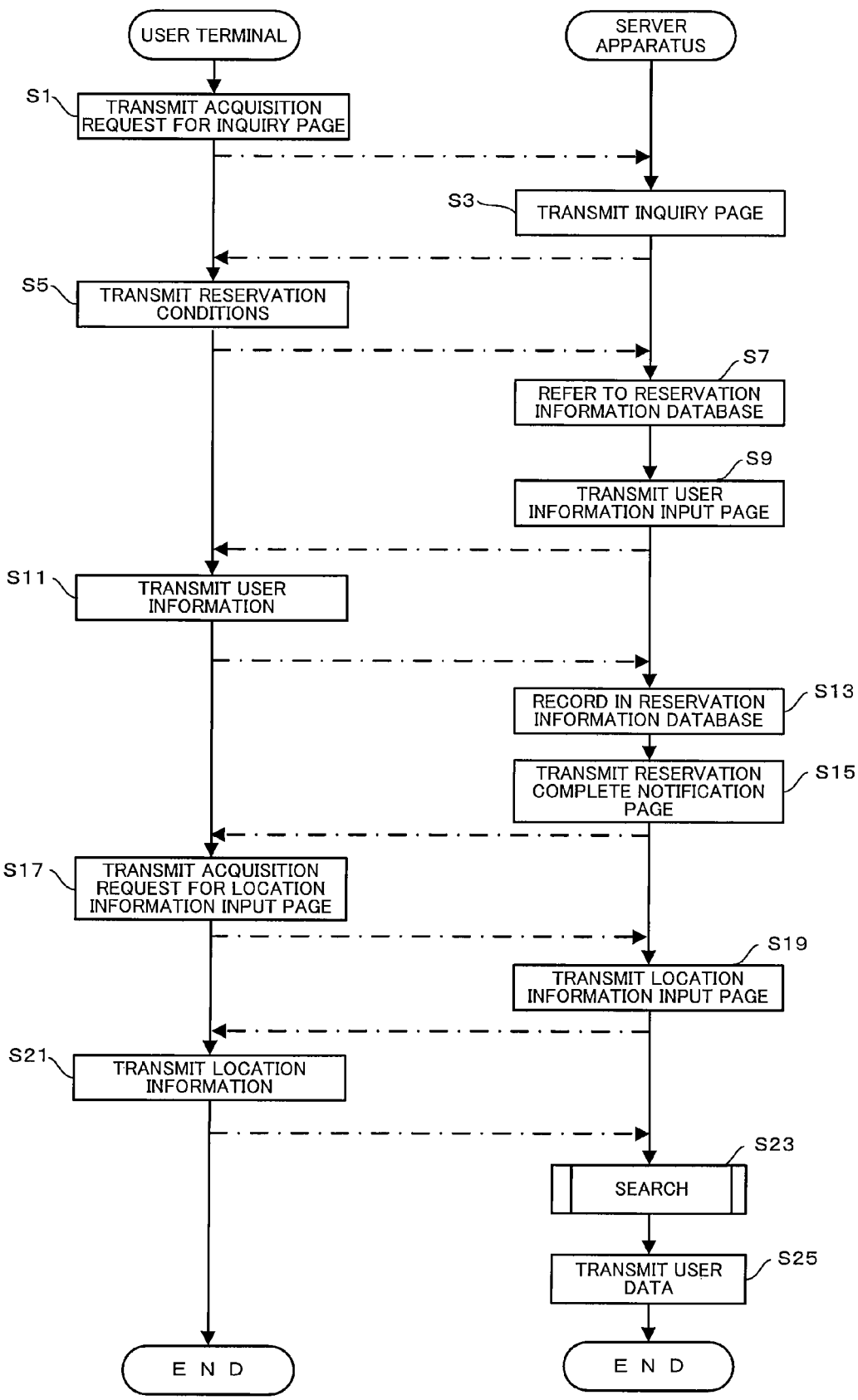
FIG. 7 is a sequence diagram showing processing performed between a user terminal and the server apparatus.

Following is a detailed description of rental car lending using the vehicle lending system in this embodiment. FIG. 7 is a sequence diagram showing processing performed between the user terminal 1 and the server apparatus 3 regarding a reservation of a rental car. Communications between the user terminal 1 and the server apparatus 3 are, for example, performed based on the HTTP protocol, and thus a request to acquire an HTML file for a rental car reservation inquiry page is transmitted from the user terminal 1 to the server apparatus 3 (S1). The server program 45 is run in the server apparatus 3, and thus the server apparatus 3 specifies the HTML file of the rental car reservation inquiry page based on a URL (Uniform Resource Locator) indicated in the received acquisition request, and reads that HTML file from the recording portion 35 and transmits it to the user terminal 1 (S3).

FIG. 8 shows an example of a rental car reservation inquiry page. In the rental car reservation inquiry page, it is possible to input the departure date and time that the user will depart the store with the rental car, the return date and time that the user will return the rental car, the store where the user will borrow the rental car, and the vehicle type of the rental car that the user will borrow. In the example rental car reservation inquiry page shown, these reservation conditions can be designated with the pull-down selection boxes, and the user inputs reservation conditions by operating the operating portion 29 of the user terminal 1. In the example shown in FIG. 8, "May 10, 2006, 12:00 P.M." is designated as the departure date and time, "May 13, 2006, 5:30 P.M." is designated as the return date and time, "ABC Station Store" is designated as the store, and "XYZ" is designated as the vehicle type. A transmit key is also provided in the rental car reservation inquiry page, and due to this being pressed, the reservation conditions that have been input to the user terminal 1 are sent to the server apparatus 3 (S5).

The CPU 31 of the server apparatus 3 is executing the reservation program 47. When the server apparatus 3 receives reservation conditions from the usage terminal 1, the server apparatus 3 refers to the reservation information database 57 and judges whether or not a reservation is possible with the reservation conditions designated by the user (S7), and when a reservation is possible, an HTML file for a user information input page is transmitted to the user terminal 1 from the server apparatus 3 (S9). When a reservation is not possible, an HTML file for a rental car reservation inquiry page with an additional character string that indicates that a reservation was not possible is again transmitted to the user terminal 1 (return to Step S3).

FIG. 9 shows an example of user information input page. In the user information input page, it is possible to input the user's name, sex, age, address, telephone number, membership number, and purpose of use, and in order to input these, text boxes, radio buttons, and selection boxes are provided. The user operates the operating portion 29 of the user terminal 1 to input these items. The membership number is, for example, a membership number of a club that provides special service to members and has a relationship with the rental car vendor. The purpose of use is the purpose for which the user will borrow the rental car. In the example shown in FIG. 9, "ICHIRO SUZUKI" is input as the name, "MALE" is input as the sex, "31" is input as the age, "1-1 SANYO-CHO, DAITO-SHI, OSAKA" "072-123-4567" is input as the telephone number, "1234567" is input as the membership number, and "SIGHTSEEING" is input as the purpose of use. A transmit key labeled "MAKE RESERVATION" is also provided in the user information input page. When this key is pressed, the user information that has been input, which also serves as the rental car reservation application, is sent to the server apparatus 3 (S11).

When the server apparatus 3 receives the user information, the server apparatus 3 stores the reservation conditions and the user information in the reservation information database 57 with a reservation number attached, thus recording the user's reservation in the reservation information database 57 (S13). Afterward, in the server apparatus 3, an HTML file is created for a reservation complete notification page that indicates a reservation number along with the reservation conditions and the user information, and transmitted to the user terminal 1 (S15). FIG. 10 shows an example of a reservation complete notification page. In the example reservation complete notification page shown, along with the reservation number "01234", the reservation conditions and user information shown in FIGS. 8 and 9 are written. Provided in the reservation complete notification page are an end key (lower left of FIG. 10) that transmits an end request communication between the user terminal 1 and the server apparatus 3, and a transmit key (lower right of FIG. 10) labeled "SET LOCATION INFORMATION". When the transmit key of the reservation complete notification page is pressed, a request for acquisition of an HTML file for a location information input page is transmitted to the server apparatus 3 (S17). Also, when the end key is pressed, an end request is transmitted to the server apparatus 3 and processing performed in the user terminal 1 related to the rental car reservation ends.

When the server apparatus 3 receives the request for acquisition of the HTML file for the location information input page, that HTML file is transmitted to the user terminal 1 (S19). FIG. 11 shows an example of the location information input page. In the location information input page a plurality of text boxes and selection boxes are provided, so that it is possible to input a name, address, or telephone number for the destination to which the user plans to go by driving the rental car, and a plurality of waypoints the user plans to visit before arriving at the destination. It is sufficient if at least one item is input for one location (destination or waypoint), but a plurality of items may also be input. In the example shown in FIG. 11, "DEF HOTEL" is input as the name of the destination, "GHI LAND" is input as the name of a first waypoint, "03-1111-2222" is input as the telephone number of a second waypoint, and "1 KASUMIGASEKI, CHIYODA-KU, TOKYO" is input as the address of the third waypoint. It is not necessary to perform input for all of the destination and the first to third waypoints; for example, input may be performed for only the destination or only the first waypoint. In the invention, the number of destinations and waypoints that can be designated is not particularly limited; for example, a location information input page in which a plurality of destination can be designated may be created.

When the transmit key of the location information input page is pressed, the location information that has been input in the location information input page is transmitted to the server apparatus 3 (S21). The server apparatus 3 stores the received location information in the reservation information database 57, and executes a search process that searches in the location information database 59 for locations corresponding to the designated destination and/or waypoints by using the location information as search conditions (S23). In Step S23, further, locations that satisfy a predetermined positional relationship with the destination or waypoints are set by using the location information database 59 and the map data 55.

Figure 12:
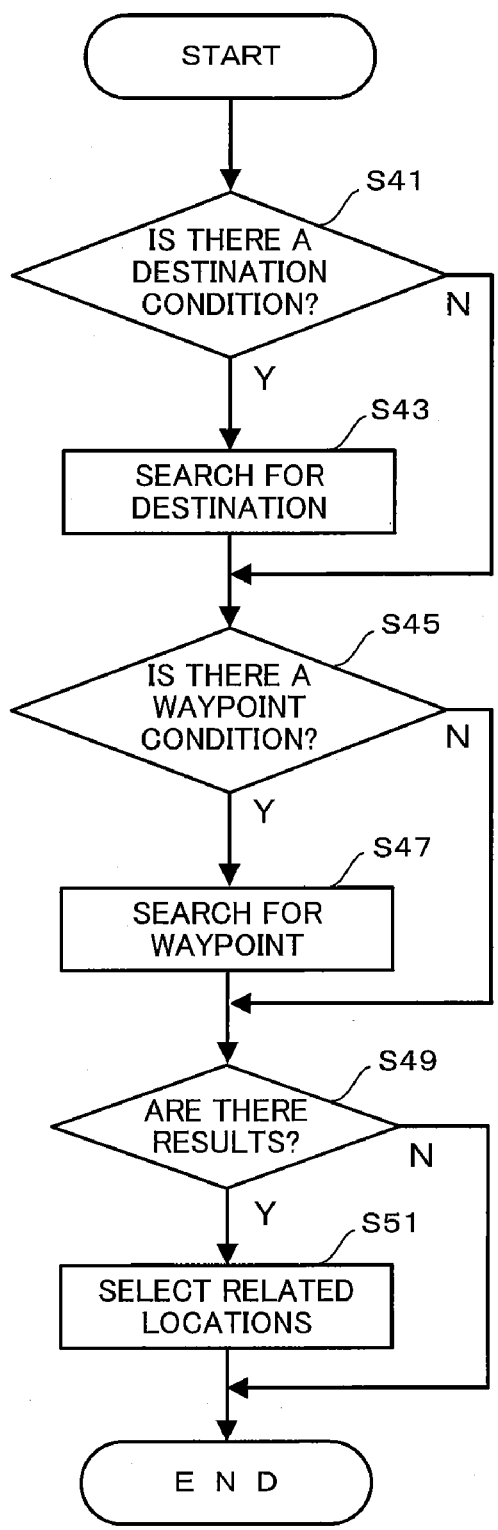
FIG. 12 is a flowchart showing a search process performed in the server apparatus.

FIG. 12 is a flowchart showing the search process of Step S23. The server apparatus 3 judges whether or not an input item related to the destination is included in the location information (S41). When an input item related to the destination is included, the location information database 59 is searched by using the item as a search condition, and a location matching the condition is identified (S43). For example, in the location information input page in FIG. 11, "DEF HOTEL" is input as the name of the destination, and in Step S43, the names stored in the location information database 59 in FIG. 4 are read in order and compared to "DEF HOTEL". As a result, the location whose ID number is "11111" is identified as the destination designated by the user. When there are a plurality of input items for the destination, in this embodiment, a search is performed for each input item.

When judged in Step S41 that an item related to the destination is not included in the location information, or, after Step S43, the server apparatus 3 judges whether or not an item related to a waypoint is included in the location information (S45). When an item related to a waypoint is included, using the designated item related to the waypoint as a search condition, a location matching that condition is identified by performing a search for the location information database 59 (S47). Step S47 is performed for all of the waypoints for which a search condition has been provided. When there are a plurality of input items for one waypoint, a search is performed for each input item.

After Step S47, a judgment is performed of whether or not effective search results have been obtained (S49). For example, when the item input by the user is inappropriate, and none of the corresponding locations are present in the location information database 59, effective search results are not obtained. In this case, the process ends. When effective search results have been obtained, i.e. when at least one location has been identified in Steps S43 and S47, related locations that satisfy a predetermined positional relationship with respect to the identified locations are selected using the map data 55 and the location information database 59 stored in the recording portion 35 (S51).

Figure 13:
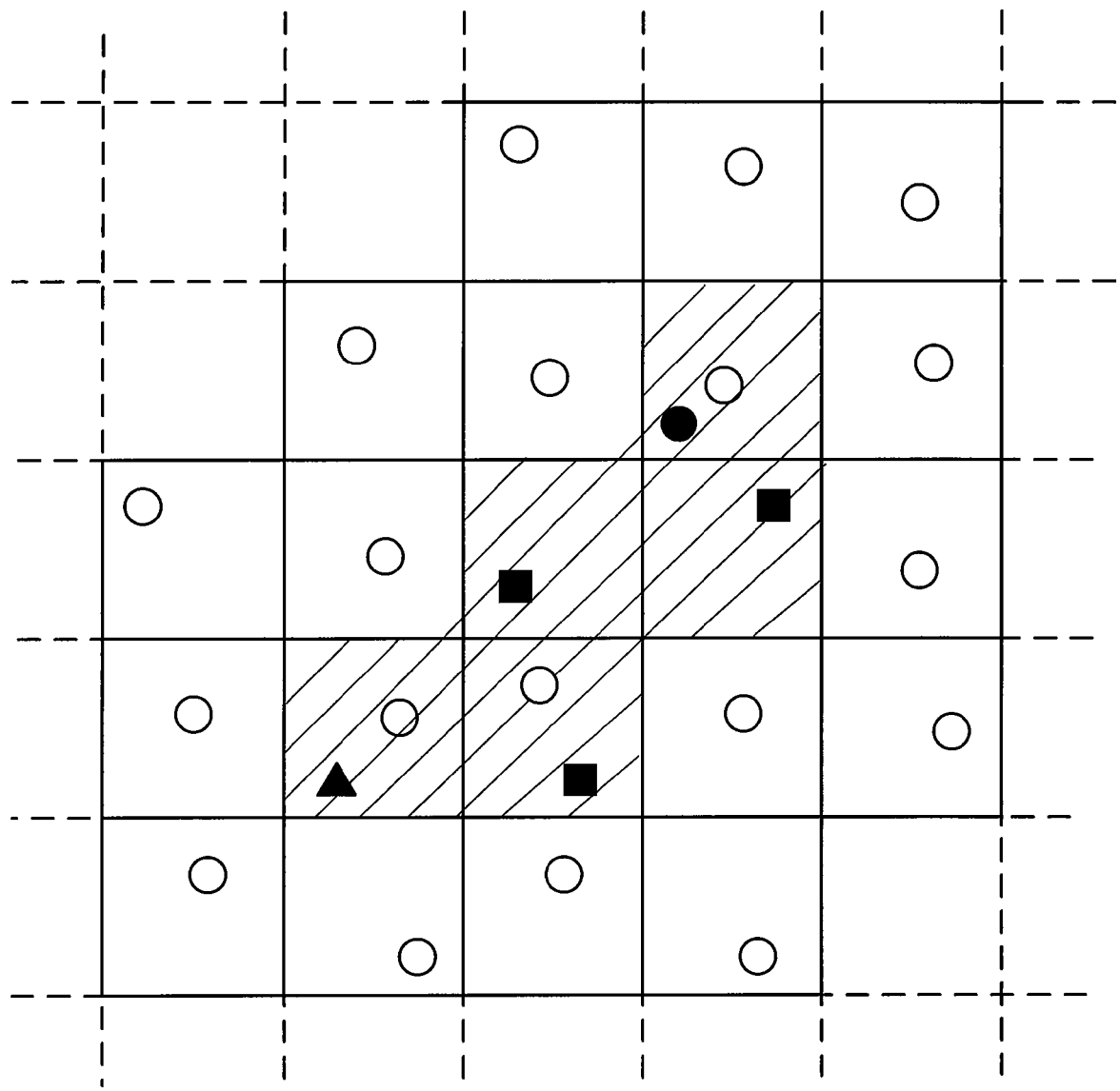
FIG. 13 is an explanatory diagram conceptually showing map data of the server apparatus and locations that have been searched in the search process.

FIG. 13 is an explanatory diagram that conceptually shows the map data 55. The map data 55 is partitioned into rectangular sections (for example, rectangular areas in which the ranges of latitude and longitude are predetermined values). In the map data 55, each section is associated with an ID number that has been stored in the location information database 59. With respect to the locations that have been identified, that is, the destination and/or waypoints that have been identified, the sections to which the identified destination and/or waypoints belong are identified by referring to the ID numbers in the location information database 59. Locations recorded in the location information database 59 and included in the thus identified sections and the sections adjacent thereto (except for the destination and/or waypoints) are selected as related locations.

In FIG. 13, the destination is indicated with a black circle and the waypoints are indicated with black squares, and diagonal lines are drawn in the sections to which these belong. Also, the locations (recorded in the location information database 59) in these sections and the sections adjacent thereto are indicated with white circles. In FIG. 13, the store where the user will borrow the rental car 9 is indicated with a black triangle, and diagonal lines are also added to the section to which it belongs. In Step S51, it is preferable that in addition to the locations with relation to the destination and the waypoints, locations in the section to which this store belongs and the sections adjacent thereto are selected as related locations. In Step S51, the positional relationship for selecting related locations is not particularly limited; the related locations may be selected using a method other than the one described above. For example, locations in a circle of a predetermined radius including the destination and the waypoints may be selected as related locations, or locations in a circle of a predetermined radius including the store which will lend out the rental car may be selected as related locations. Also, it is possible to search for a path from the store to the destination via the waypoints, and set locations existing near the path as related locations.

In this embodiment, in Step S51, a process is also performed that selects a related location that satisfies a predetermined condition for an item of the location information database 59 from the related locations that have been selected in the manner described above. Taking the location information database 59 shown in FIG. 4 as an example, related locations whose category is "SIGHTSEEING", related locations related to emergency facilities whose category is "ROAD SERVICE", "HOSPITAL", "GASOLINE STATION", "TOILET", "POLICE", or the like, and related locations whose "AFFILIATION" is "YES" and whose category is "RESTAURANT", "GASOLINE STATION", "PARKING LOT", "HOTEL", "SHOPPING", or the like, are ultimately selected.

Again referring to FIG. 7, after Step S23, the server apparatus 3 creates the user data 79 based on the recorded matters in the databases 57 and 59, and the results of Step S23, and then transmits the created user data 79 to a target store terminal 5 along with a notification indicating that a reservation has been made (S25).

The user data 79 includes the reservation data 105 and the candidate site data 107. The reservation data 105 is created based on the reservation information database 57, and is data related to the user's name, reservation number, and the like. The candidate site data 107 includes matters (except for image file and audio file paths) recorded in the location information database 59 such as the latitude, longitude, and name for the destination and/or waypoints identified in Step S43 and/or S45 in FIG. 12. Further, when Step S51 in FIG. 12 has been performed, the candidate site data 107 also includes matters (except for image file and audio file paths) recorded in the location information database 59 such as the latitude, longitude, name, and the like for one or a plurality of related locations that have been ultimately selected. Further, it is preferable that the candidate site data 107 includes matters related to the latitude, longitude, name, and the like of a store that can be the site for returning the rental car (for example, these matters are identified according to the store information present in the reservation information database 57).

When the path of an image file or an audio file is recorded in the location information database 59 for an identified destination, waypoint, or related location, the server apparatus 3 reads the image file or audio file stored in the recording portion 35 based on the recorded items of the location information database 59 and adds the read file to the user data 79. It is preferable that a specification unique to the navigation apparatus 11 is used as the data format of the user data 79, so that the user data 79 cannot be used in a navigation apparatus of a different manufacturer.

The server apparatus 3 and the store terminal 5, for example, communicate based on the FTP protocol, and along with notifying the store having the store terminal 5 of the fact that a reservation has been made, the user data 79 sent from the server apparatus 3 is stored in the recording portion 65 of the store terminal 5. When the user that made the reservation visits the store, the operator of the store terminal 5 installs the recording medium 13 in the store terminal 5, stores the user data 79 in the recording portion 65 on the recording medium 13, and gives the recording medium 13 on which the user data 79 has been stored to the user. The user installs the received recording medium 13 in the navigation apparatus 11 of the rental car 9 that the user will drive.

When the end key in the reservation complete notification page shown in FIG. 10 is pressed and location information is not input, the server apparatus 3 creates only the reservation data 105 based on the reservation information database 57 after receiving a request to end communications between the user terminal 1 and the server apparatus 3 from the user terminal 1. Then, the server apparatus 3 transmits user data 79 that does not include the candidate site data 107 along with a notification that a reservation has been made to a target store terminal 5 (Step S25 in FIG. 7).

Following is a description of the operation of the navigation apparatus 11. FIG. 14 is a flowchart showing the operation of the navigation apparatus 11. When the recording medium 13 is installed in the slot 103 and the power key of the operating portion 101 is pressed, a reservation number input screen shown in FIG. 15 is displayed in the display portion 97 of the navigation apparatus 11 (S61). A touch panel constituting the operating portion 101 is disposed on the display area of the display portion 97, and the user operates a numeric keypad or the like provided as soft keys to input a reservation number. The CPU 89 of the navigation apparatus 11 judges whether or not a cancel key labeled "CANCEL" has been pressed (S63), and also judges whether or not the reservation number input by the user matches the reservation number included in (the reservation data 105 of) the user data 79 (S65). When these reservation numbers do not match, the reservation number input screen is displayed again.

When the input reservation number matches the reservation number of the user data 79, the CPU 89 of the navigation apparatus 11 judges whether or not the candidate site data 107 is included in the user data 79 (S67). When the candidate site data 107 is not included, or when the cancel key has been pressed in the reservation number input screen shown in FIG. 15, the navigation apparatus 11 moves to an ordinary or normal operating mode, and an ordinary operating screen (not shown) in which a destination or waypoint is searched for or set by entering characters is displayed in the display portion 97 (S69).

Figure 16:
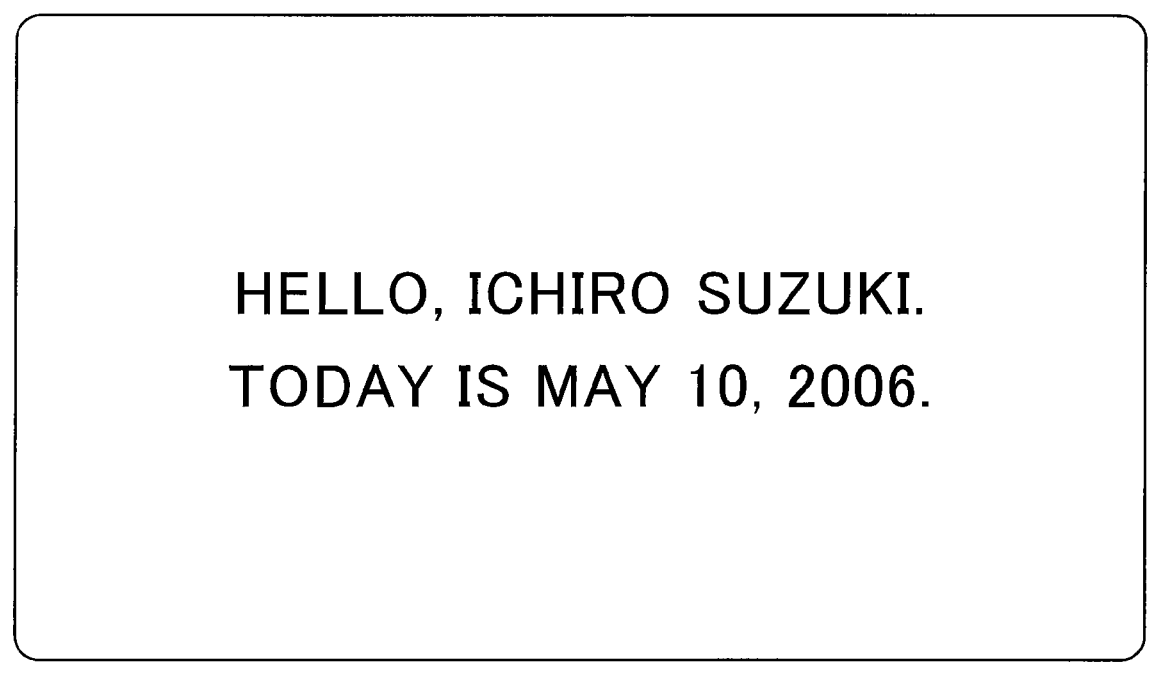

When the candidate site data 107 is included in the user data 79, after Step S67, the navigation apparatus 11 moves to a user-dedicated mode (S71). When the navigation apparatus 11 moves to the user-dedicated mode, an initial screen showing the user's name and the like is displayed in the display portion 97 (S73). FIG. 16 shows an example of the initial screen.

Figure 17:
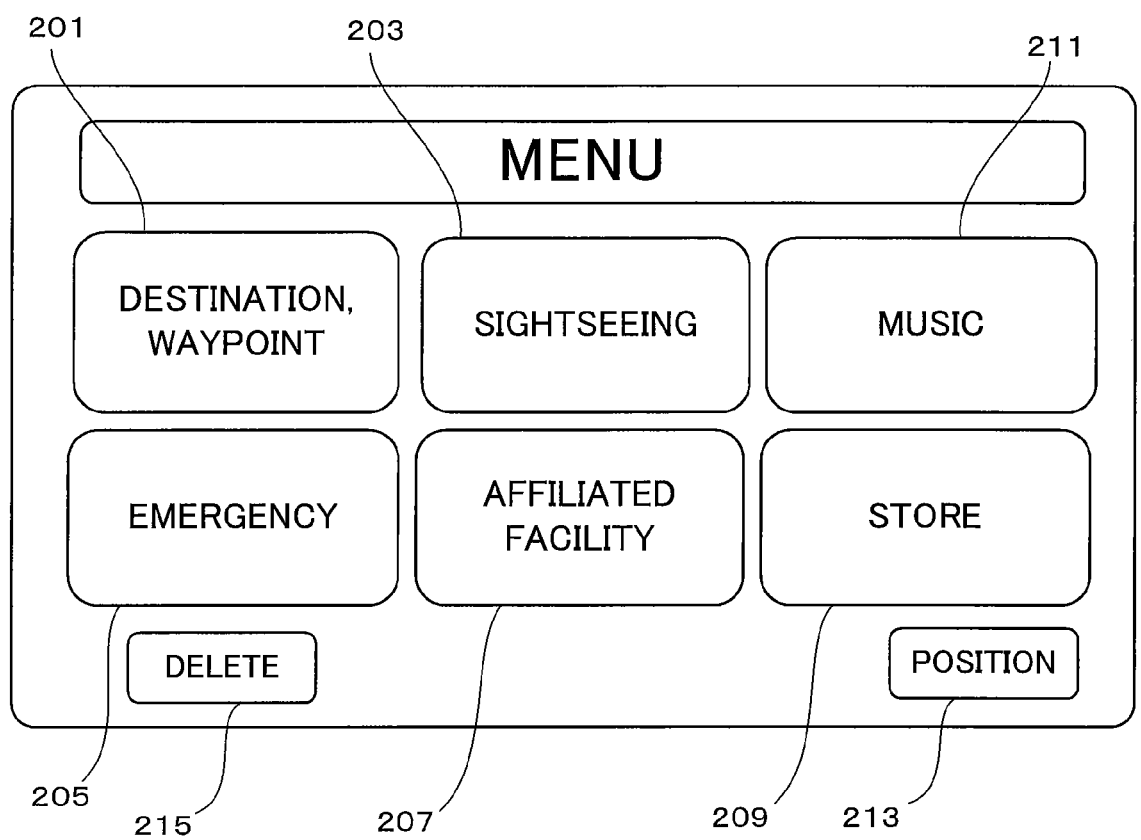
FIG. 17 is an explanatory diagram showing an example of a menu screen displayed by the navigation apparatus.

After Step S73, a menu screen shown in FIG. 17 is displayed in the display portion 97 based on the image data stored in the ROM 93 (or on the recording medium 13) (S75). Provided in the menu screen are a key 201 that instructs to display a screen for selecting a destination or waypoint, a key 203 that instructs to display a screen for selecting a sightseeing site, a key 205 that instructs to display a screen for selecting an emergency facility type, a key 207 that instructs to display a screen for selecting an affiliated facility type, and a key 209 that instructs to display a screen for selecting a store of the rental car vendor.

The navigation apparatus 11 is capable of music file playback, and the menu screen is also provided with a key 211 that displays a selection screen for selecting a music file to be played back when music files are stored on the recording medium 13. A position key 213 disposed in the lower right is pressed when the user confirms the present position of the vehicle (the rental car 9). When the position key 213 is pressed, a map (not shown) showing the present position of the vehicle is displayed in the display portion 97. When a return key displayed in this map is pressed, the display portion 97 returns to the prior display. This sort of position key 213 is also provided in other screens that are displayed in the user-dedicated mode.

A delete key 215 disposed in the lower left is used when instructing to delete the user data 79. The CPU 89 of the navigation apparatus 11 is detecting whether or not the delete key 215 has been pressed (S77). When the delete key 215 is pressed, the user data 79 is deleted from the recording medium 13 (S79), and the navigation apparatus 11 is moved to the ordinary operating mode (S69). The delete key 215 is also used when the user wishes to use the navigation apparatus 11 in only the ordinary operating mode and so the user data 79 has become unnecessary, or when the user returns the rental car 9.

When the key 201 of the menu screen shown in FIG. 17 is pressed, the rendering portion 95 creates image data of a selection screen for selecting a destination or waypoint to be used as the end point of the guidance path from the destination and waypoints included in the candidate site data 107, and in the display portion 97, the selection screen is displayed based on the created image data.

Figure 18:
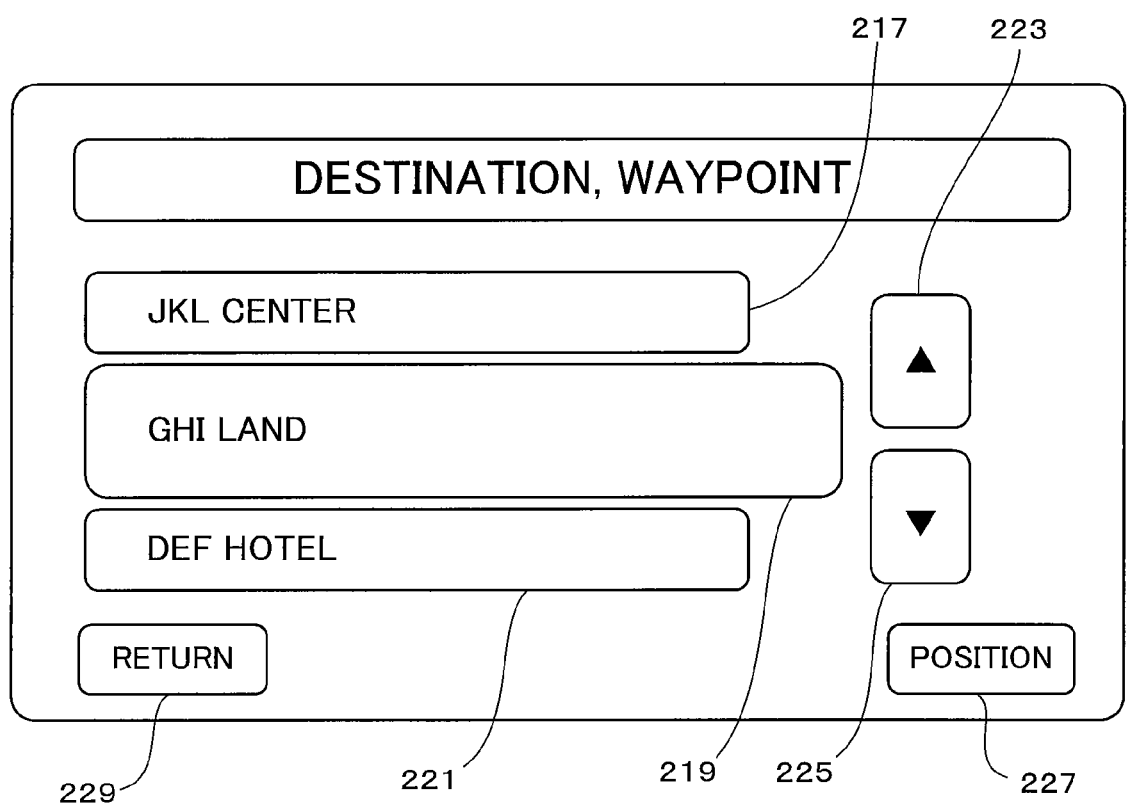
FIG. 18 is an explanatory diagram showing an example of a screen for selecting a destination and waypoints displayed by the navigation apparatus.

FIG. 18 shows an example of the screen for selecting a destination or waypoint. In the example selection screen shown, three areas 217, 219, and 221 are provided that are long in the lateral direction and in which names of the destination and/or waypoints are respectively displayed. Up to three destinations and/or waypoints are shown to the user at one time (when the name of the destination or waypoint is not present, its address is displayed). The center area 219 is thicker than the remaining two areas 217 and 221. Provided to the right side of these areas 217, 219, and 221 are an up key 223 and a down key 225 that change the combination of names displayed in the selection screen. For example, when the up key 223 is pressed in the state shown, the selection screen is changed such that the name "GHI LAND" is displayed in the uppermost area 217, and the name "DEF HOTEL" is displayed in the center area 219. The name of a destination or waypoint that is not shown in FIG. 18 is displayed in the lowermost area 221. When the up key 223 is further pressed, the name "DEF HOTEL" is displayed in the uppermost area 217. For example, when the down key 225 is additionally pressed twice, the selection screen returns to the state shown in FIG. 18. A position key 227 is provided in the lower right of the selection screen, and a return key 229 is provided in the lower left of the selection screen. When the return key 229 is pressed, the menu screen shown in FIG. 17 is displayed.

Figure 19:
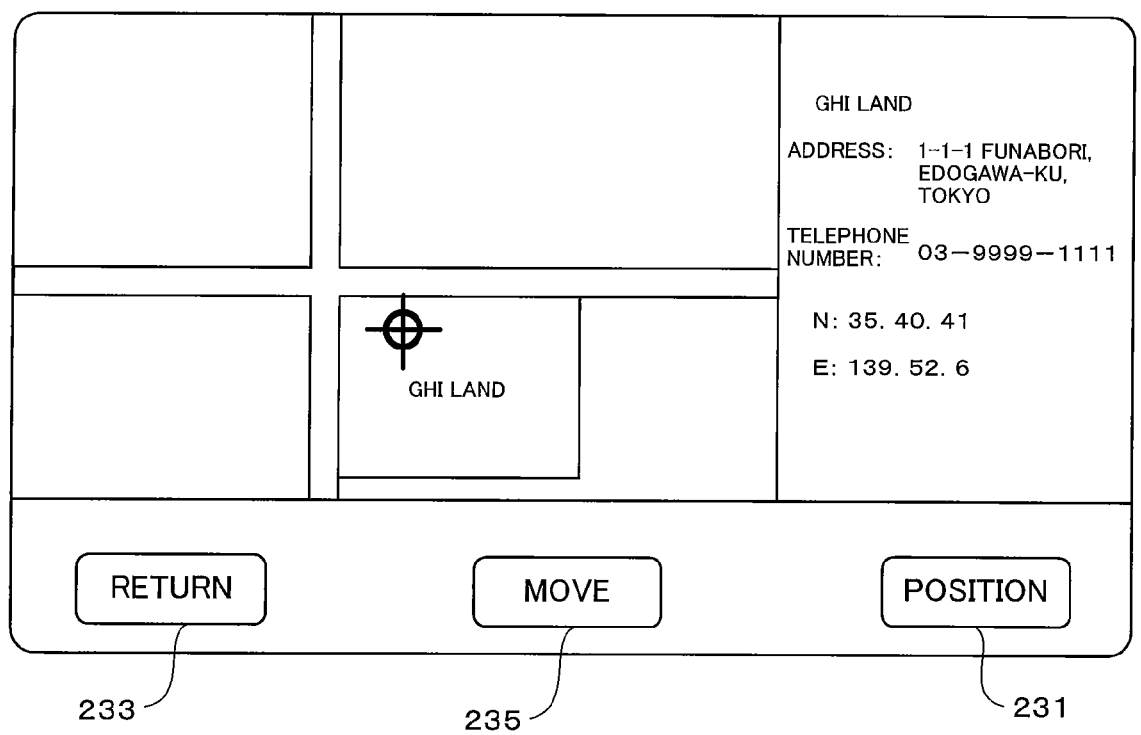
FIG. 19 is an explanatory diagram showing an example of a screen for setting a destination and waypoints displayed by the navigation apparatus.

When the center area 219 in which a destination or waypoint has been displayed in the screen for selecting a destination or waypoint is pressed, the CPU 89 and the rendering portion 95 of the navigation apparatus 11 refer to the map data 77 and the candidate site data 107 to perform a process that displays in the display portion 97 a setting screen that shows a vicinity map of that destination or waypoint, and information related to that destination or waypoint. When the center area 219 is pressed in the state shown in FIG. 18, a setting screen for "GHI LAND" as shown in FIG. 19 is displayed. Provided in the setting screen is, in addition to a position key 231 and a return key 233, a confirmation key 235 labeled "MOVE", and when the confirmation key 235 is pressed, the destination or waypoint (in the example given in this description, the first waypoint "GHI LAND") shown in the setting screen is set as the end point of the guidance path.

The CPU 89 of the navigation apparatus 11, after the menu screen has been displayed, judges whether or not the end point of the guidance path has been set (S81), and when the end point of the guidance path has been set, refers to the map data 77 to search for paths from the present position of the vehicle to the end point, and thus determines the guidance path (S83). The path search is, for example, performed using the Dijkstra method, and the path with the lowest path cost (for example, travel time) is determined as the guidance path.

Figure 20:
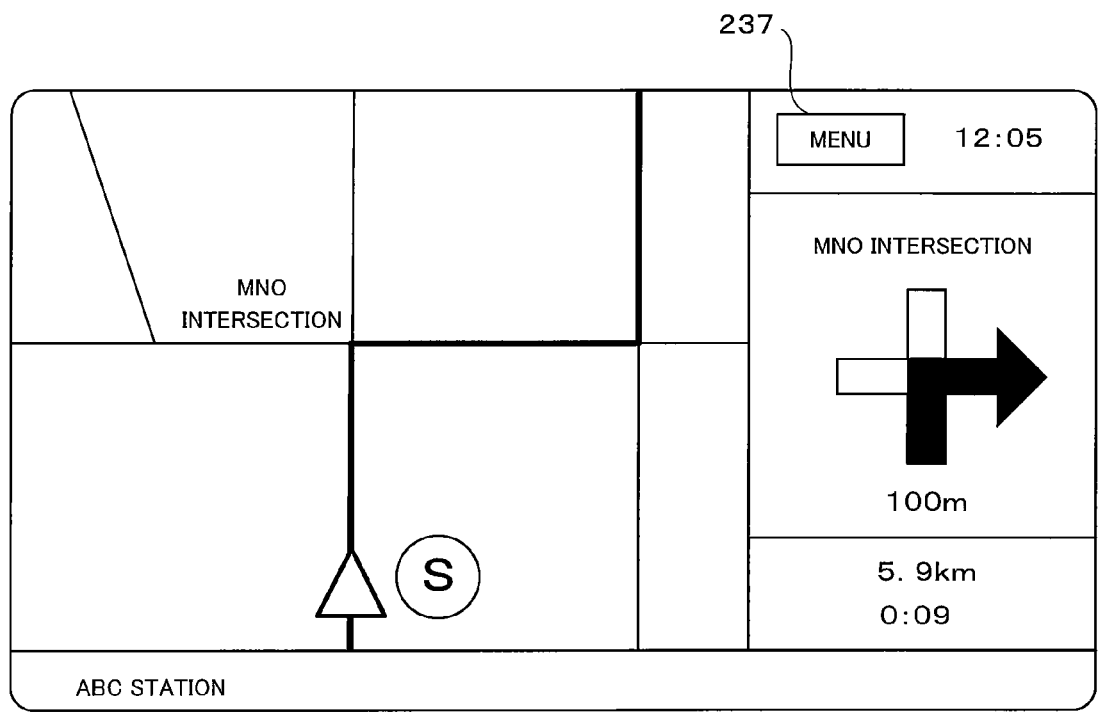
FIG. 20 is an explanatory diagram showing an example of a guidance screen displayed by the navigation apparatus.

When determining the guidance path, the navigation apparatus 11 starts a guidance operation, and a guidance screen is displayed in the display portion 97 (S85). Displayed in the guidance screen is a map showing the present position of the vehicle and the guidance path, and course change information at intersections or the like. The CPU 89 and the rendering portion 95 of the navigation apparatus 11 perform a process that refers to the map data 77 to create a guidance screen according to the progress of the vehicle (the rental car 9), based on the vehicle position identified with the GPS receiving portion, the vehicle direction identified with the sensor portion 87, and the like. FIG. 20 shows an example of the guidance screen. A menu key 237 for returning to the menu screen is provided in the upper right of the guidance screen. The CPU 89 is detecting whether or not the menu key 237 has been pressed (S87). When the menu key 237 is pressed, the menu screen is displayed (S75). When the end of operation is instructed via the operating portion 71 such as when the user exits the vehicle, operation of the navigation apparatus 11 ends (S89).

For example, when the user wishes to stop by a nearby sightseeing site while driving the rental car 9, or wishes to go to a nearby sightseeing site from the store where the rental car 9 was borrowed (before going to a destination or waypoint), the user calls up the menu screen shown in FIG. 17. When the key 203 in the menu screen is pressed, the CPU 89 and the rendering portion 95 create image data for the sightseeing site selection screen based on the candidate site data 107, and perform a process that displays the selection screen in the display portion 97.

Figure 21:
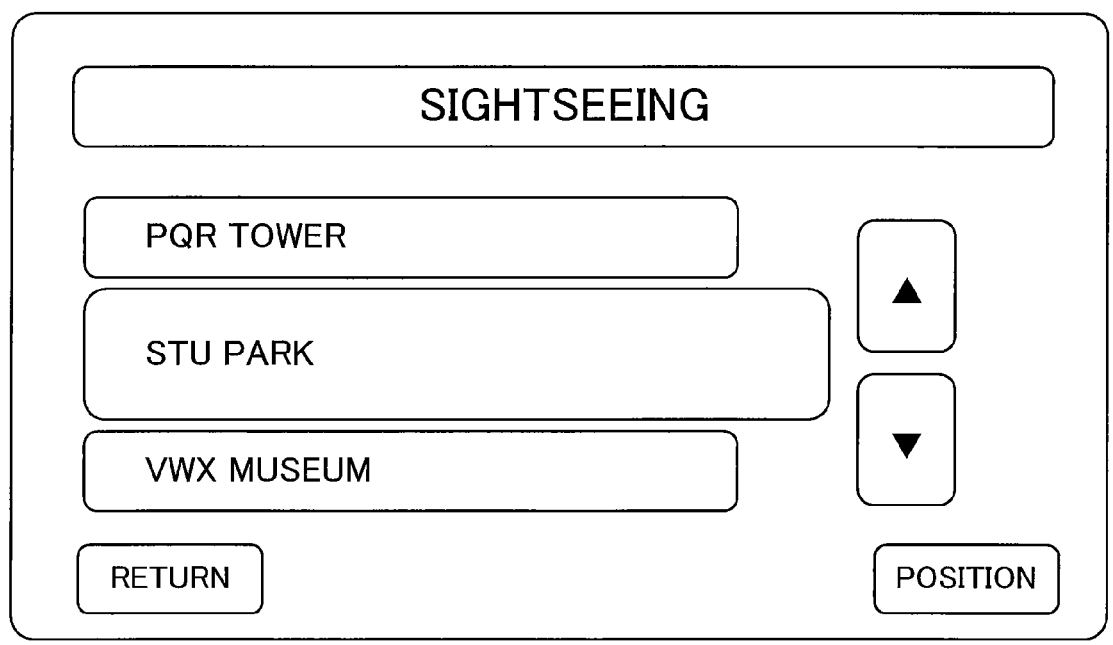
FIG. 21 is an explanatory diagram showing an example of a sightseeing site selection screen displayed by the navigation apparatus.

FIG. 21 shows an example of the sightseeing site selection screen. The sightseeing site selection screen is configured like the screen for selecting a destination or waypoint shown in FIG. 18. In the sightseeing site selection screen, the related location (i.e. sightseeing site) used as the end point of the guidance path is selected from the related locations that have been selected in Step S51 in FIG. 12 and have the category "SIGHTSEEING" in the location information database 59 of the server apparatus 3.

Figure 22:
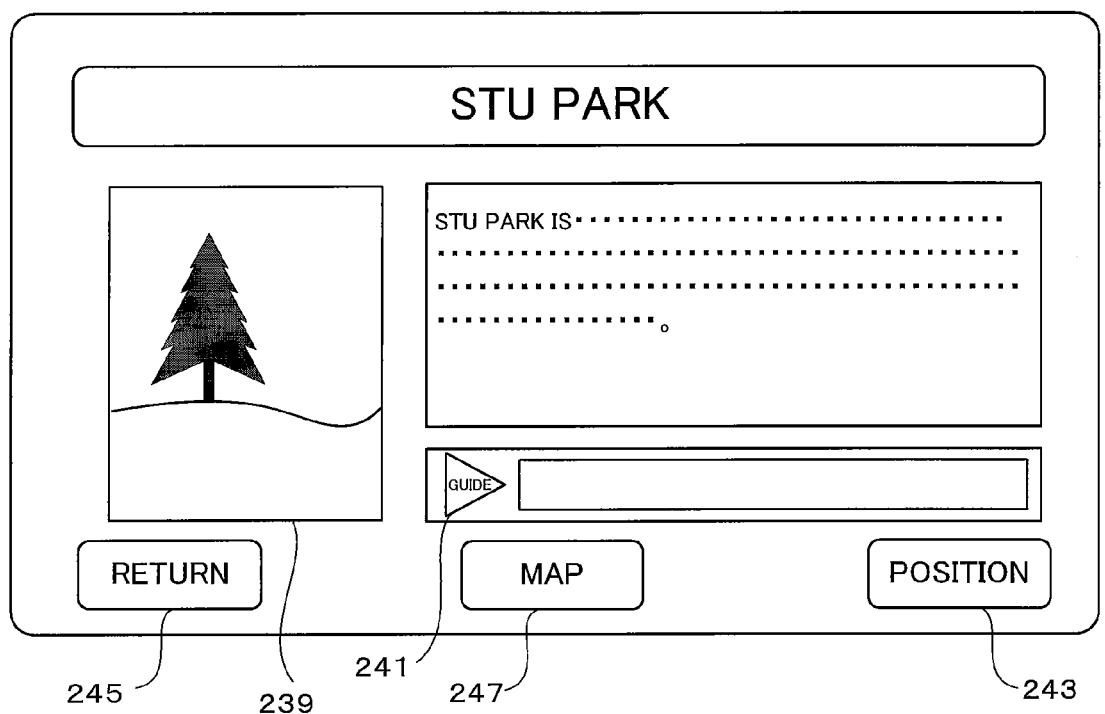
FIG. 22 is an explanatory diagram showing an example of a sightseeing site introduction screen displayed by the navigation apparatus.

When the thick center area labeled with the name of a sightseeing site in the sightseeing selection screen is pressed, the CPU 89 and the rendering portion 95 refer to the candidate site data 107 to perform a process that displays an introduction screen of the sightseeing site in the display portion 97. For example, when the area labeled "STU PARK" in the selection screen shown in FIG. 21 is pressed, an introduction screen of "STU PARK" shown in FIG. 22 is displayed in the display portion 97. An image 239 based on the image data of "STU PARK" included in the user data 79 is disposed in the left side of the introduction screen, and comments related to "STU PARK" included in the candidate site data 107 (content of the comments in the location information database 59 (see FIG. 4)) are written in the right side of the introduction screen. A triangular playback key 241 below the comments instructs playback of audio data that introduces "STU PARK" (included in the user data 79). When the playback key 241 is pressed, the CPU 89 decodes the audio data for "STU PARK" included in the user data 79 and sends it to an audio output portion 99, and the audio output portion 99 converts the sent audio data into a voice in a speaker by changing the audio data into an analog signal and amplifying that analog signal. Also, the CPU 89 and the rendering portion 95 perform a process that displays a bar indicating the playback time of the audio data to the right side of the playback key 241.

Further provided in the introduction screen are a position key 243, a return key 245, and a key 247 labeled "MAP" that instructs to display a setting screen. When the key 247 is pressed, a setting screen (not shown) for the sightseeing site introduced by the introduction screen is displayed in the display portion 97. The sightseeing site setting screen is configured like the setting screen for a destination or waypoint shown in FIG. 19. When a confirmation key is pressed in the sightseeing site setting screen, the sightseeing site is set as the end point of the guidance path, and a path search is performed.

Figure 23:
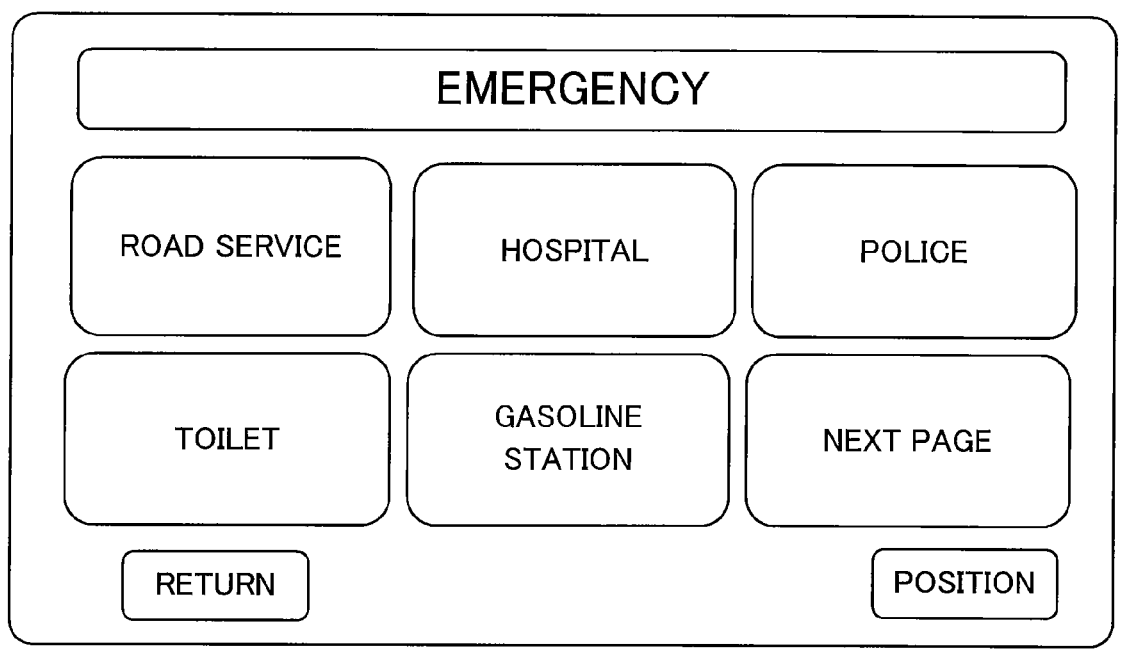
FIG. 23 is an explanatory diagram showing an example of an emergency facility category selection screen displayed by the navigation apparatus.

When the vehicle malfunctions during driving or a fellow passenger becomes sick, the user calls up the menu screen shown in FIG. 17 and presses the key 205 labeled "EMERGENCY". When the key 205 is pressed, a screen for selecting an emergency facility type (i.e. a category) as shown in FIG. 23 is displayed based on the candidate site data 107. Provided in the category selection screen are a plurality of keys for selecting the category of the related locations to be candidates for the end point of the guidance path. These keys are labeled with character strings corresponding to the categories in the location information database 59 such as "ROAD SERVICE" or "HOSPITAL". When a key labeled "NEXT PAGE" is pressed, another selection screen having keys is displayed.

Figure 24:
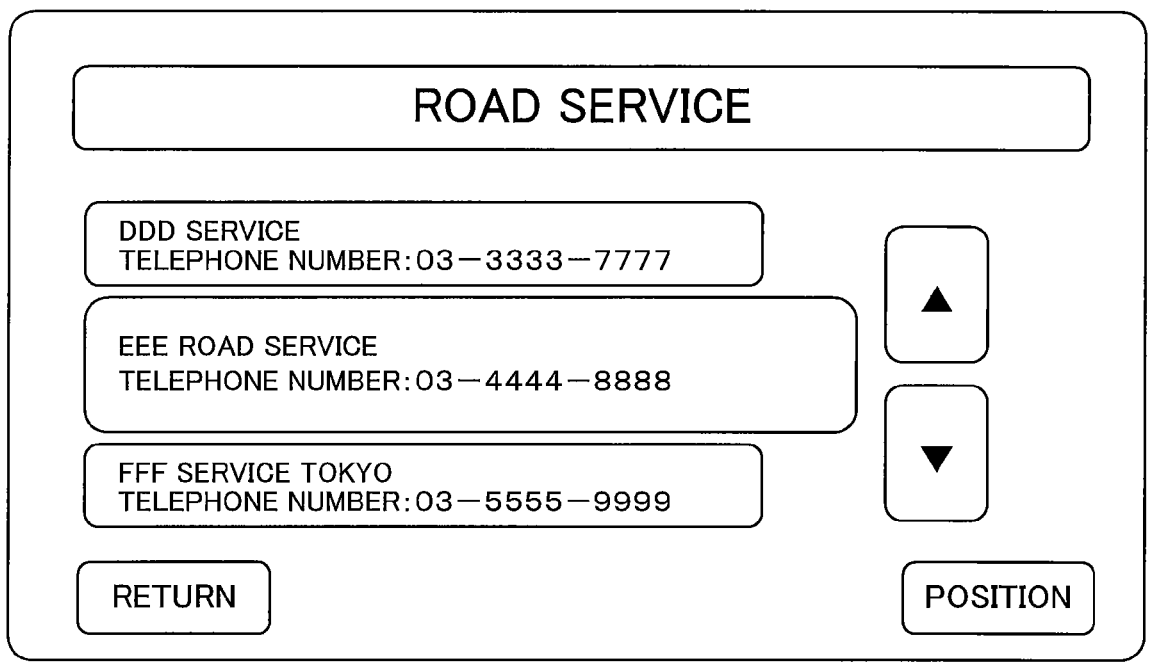
FIG. 24 is an explanatory diagram showing an example of a road service selection screen displayed by the navigation apparatus.

When a key labeled, for example, "ROAD SERVICE" is pressed in the selection screen shown in FIG. 23, a road service selection screen shown in FIG. 24 is displayed based on the candidate site data 107. The road service selection screen shows to the user the related locations that have been selected in Step S51 in FIG. 12 and have the category "ROAD SERVICE" in the location information database 59 of the server apparatus 3. This selection screen is configured like the selection screen shown in FIG. 18, and when a thick center area is pressed, a setting screen for the road service displayed in the center area (for example, a screen similar to the setting screen shown in FIG. 19) is displayed in the display portion 97. Because it is rarely the case that the user himself goes to the road service, the telephone numbers of the road services are displayed along with the names of the road services. The user views the road service selection screen, and telephones a road service that is judged to be appropriate.

Figure 25:
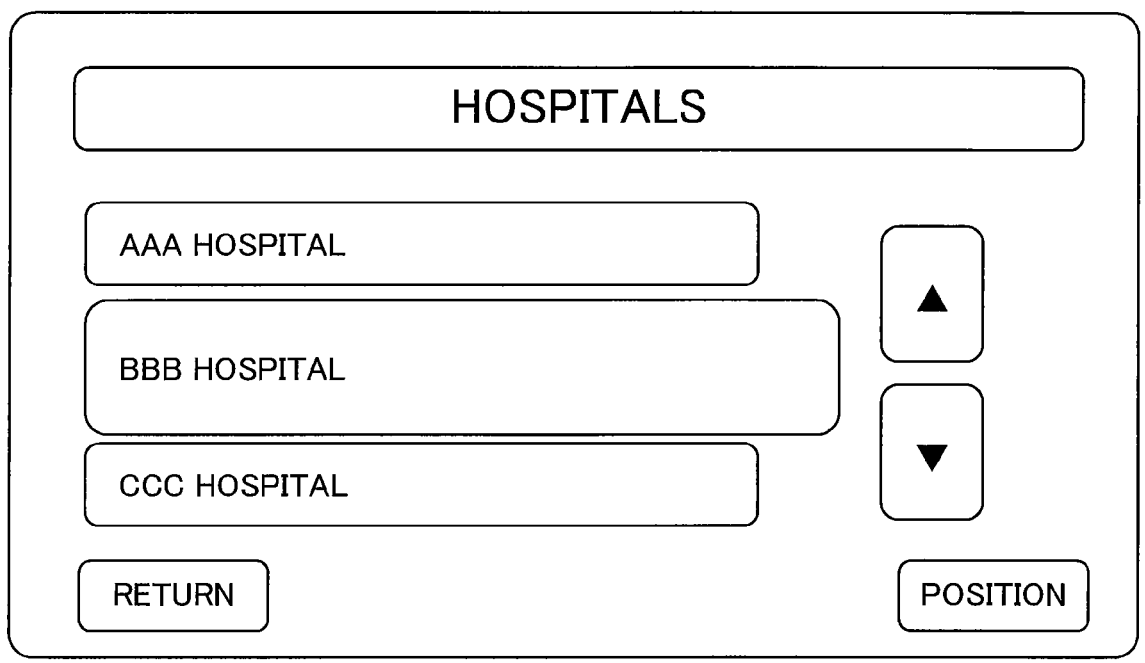
FIG. 25 is an explanatory diagram showing an example of a hospital selection screen displayed by the navigation apparatus.

When the key labeled "HOSPITAL" is pressed in the selection screen shown in FIG. 23, a hospital selection screen as shown in FIG. 25 based on the candidate site data 107. The hospital selection screen shows to the user the related locations that have been selected in Step S51 in FIG. 12 and have the category "HOSPITAL" in the location information database 59 of the server apparatus 3. This selection screen is configured like the selection screen shown in FIG. 18, and when a thick center area is pressed, a setting screen (not shown) for the hospital whose name is shown in the center area is displayed in the display portion 97 in the same manner as in FIG. 19. When a confirmation key in the setting screen is pressed, the hospital shown in the setting screen is set as the end point of the guidance path.

When, in this manner, the navigation apparatus 11 operates in the user-dedicated mode, during an emergency, a search is easily made for a facility such as a hospital that is near the vehicle, and furthermore a guidance path with that facility used as the end point is quickly determined. Also when the key labeled "POLICE", "TOILET", or "GASOLINE STATION" has been pressed in the selection screen shown in FIG. 23, a selection screen is displayed like that displayed when the key labeled "HOSPITAL" is pressed (further, by operating the selection screen, a setting screen is displayed for setting a selected police station, toilet, or the like as the end point of the guidance path).

When the key 207 labeled "AFFILIATED FACILITY" is pressed in the menu screen shown in FIG. 17, a screen for selecting an affiliated facility type (i.e. a category) as shown in FIG. 26 is displayed based on the candidate site data 107. This selection screen has the same configuration as the selection screen in FIG. 23. Provided in the category selection screen are keys labeled with character strings such as "RESTAURANT", "GASOLINE STATION", and "HOTEL" that correspond to the categories in the location information database 59.

Figure 27:
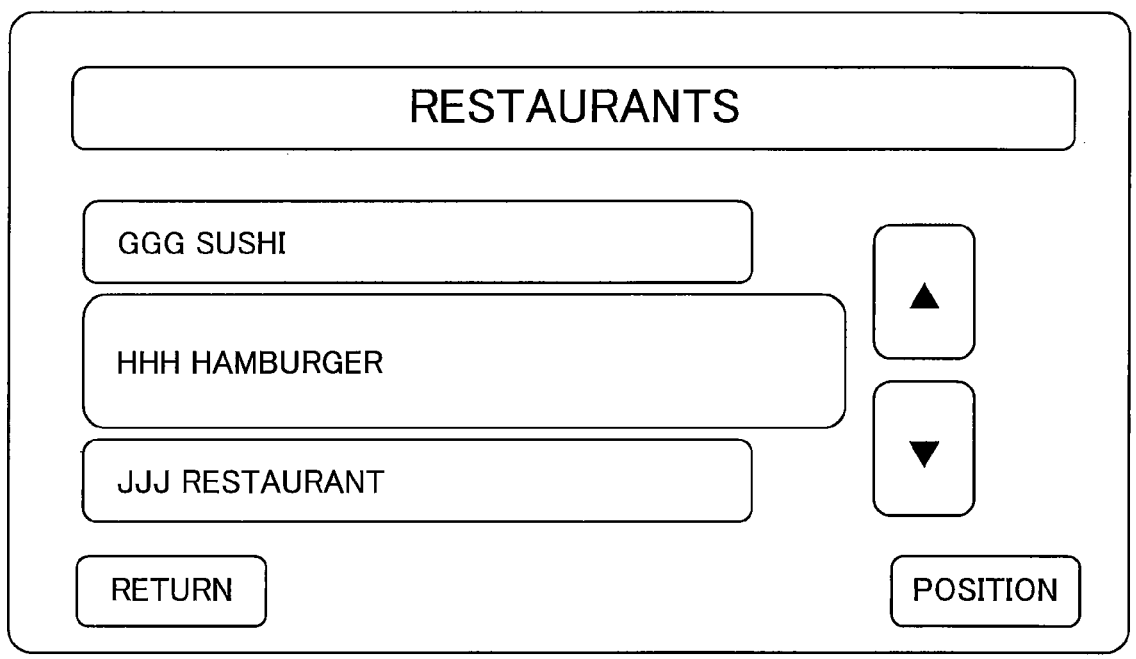
FIG. 27 is an explanatory diagram showing an example of a restaurant selection screen displayed by the navigation apparatus.

When, for example, a key labeled "RESTAURANT" is pressed in the selection screen shown in FIG. 26, a restaurant selection screen as shown in FIG. 27 is displayed based on the candidate site data 107. The restaurant selection screen shows to the user the related locations that have been selected in Step S51 in FIG. 12, have the category "RESTAURANT" in the location information database 59 of the server apparatus 3, and have "YES" for the item affiliation. This selection screen is configured like the selection screen shown in FIG. 18, and when the thick center area is pressed, a selection screen for the restaurant shown in that area is displayed in the display portion 97 in the same manner as in FIG. 19. When the confirmation key is pressed in this setting screen, the restaurant displayed in the setting screen is set as the end point of the guidance path. The description of the case in which the key labeled "RESTAURANT" is pressed is also true for a case in which the key labeled with the character string "GASOLINE STATION", "HOTEL", or the like is pressed.

When, in this manner, the navigation apparatus 11 operates in the user-dedicated mode, when the user has a meal, goes shopping, or the like, a search is easily made for a facility such as a restaurant near the vehicle, and furthermore a guidance path with the found facility used as the endpoint is quickly determined. Also, as in this embodiment, by selecting an affiliated facility and showing it to the user, it is possible for the rental car vendor to guide the user to an affiliated restaurant, gasoline station, or the like.

Figure 28:
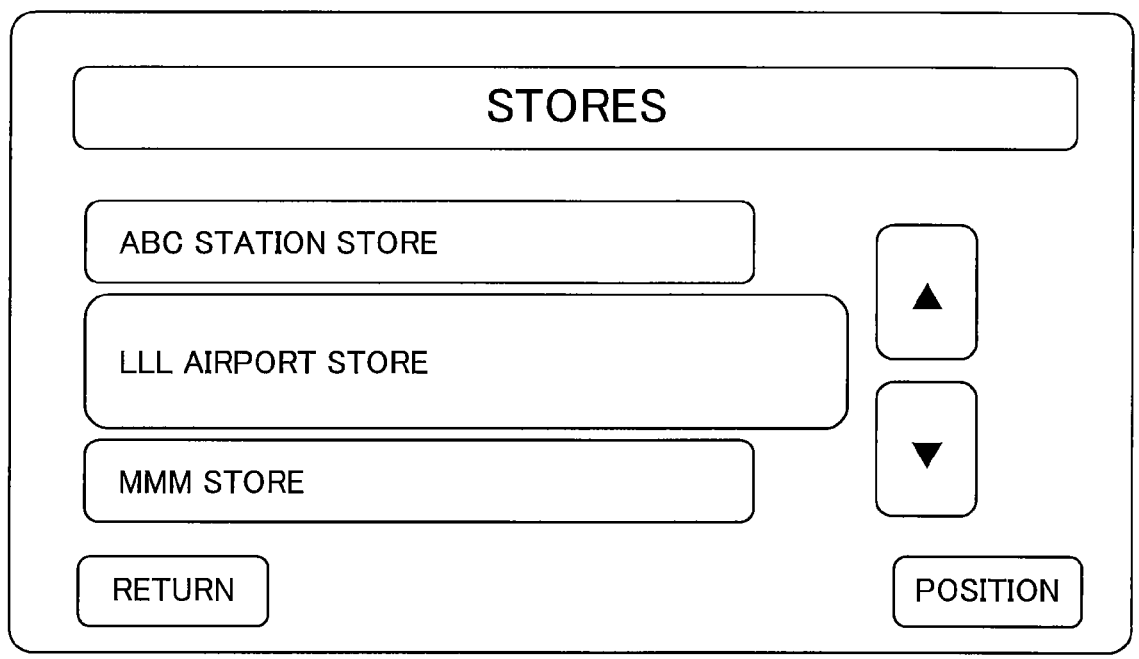
FIG. 28 is an explanatory diagram showing an example of a rental car vendor store selection screen displayed by the navigation apparatus.

When the key 209 labeled "STORE" is pressed in the menu screen shown in FIG. 17, a screen for selecting a store of the rental car vendor is displayed as shown in FIG. 28, based on the candidate site data 107. This selection screen is configured like the selection screen shown in FIG. 18, and when a thick center area is pressed, a setting screen for the store shown in the center area is displayed in the display portion 97 in the same manner as in FIG. 19. In this manner, in the case that the navigation apparatus 11 operates in the user-dedicated mode, when the user returns the rental car 9, a search is easily made for a store near the vehicle, and furthermore a guidance path with the found store used as the endpoint is quickly determined.

In the embodiment above, the user data 59 recorded in the store terminal 5 is provided to the navigation apparatus 11 via the recording medium 13, but the user data 59 may also be provided to the navigation apparatus 11 by performing communications between the navigation apparatus 11 and the store terminal 5 (for example, by connecting them using a wireless LAN or the like). Also, in the embodiment above, the user data 59 and the map data 77 are both stored on the recording medium 13, but the user data 59 and the map data 77 may be stored on separate recording media (for example, the usage data 59 being stored on a memory card, and the map data 77 stored on a DVD or hard disk).

In some of the attached drawings, name, address, telephone number, latitude, longitude, and the like are specifically shown, but it should be noted that these are shown simply by way of example. Also, the description of the embodiment above is provided in order to illustrate the invention, and should not be considered as limiting the invention described in the claims, or reducing the scope thereof. Also, the configurations of each element of the invention are not limited to the embodiment above, and may be variously modified within the technical scope indicated by the scope of the claims.

What is claimed is:

1. A navigation apparatus comprising a display portion that displays a guidance screen, a removably installed recording medium, and a CPU judging whether or not candidate site data created by an external apparatus is stored on the recording medium when the recording medium is installed, the navigation apparatus being provided in a vehicle and guiding the vehicle along a guidance path; wherein when the candidate site data is stored on the recording medium, a selection screen for selectively setting an end point of the guidance path is displayed in the display portion based on the candidate site data, when the end point is set, a guidance path that arrives at the end point is calculated, the candidate site data includes information related to one or a plurality of locations that are designated in advance before the recording medium is installed, and the end point is selected from the one or a plurality of locations via the selection screen, and, when the candidate site data is not stored on the recording medium, an operating screen in which the end point is searched for or set by entering characters is displayed in the display portion.

2. The navigation apparatus according to claim 1, wherein the candidate site data further includes information related to one or a plurality of related locations that satisfy a predetermined positional relationship with the one or a plurality of locations, and the end point is selected from the one or a plurality of locations and the one or a plurality of related locations.

3. The navigation apparatus according to claim 2, wherein the candidate site data includes information related to a classification for each of the one or a plurality of related locations, and in the display portion, the one or a plurality of related locations are shown differentiated according to those classifications.

4. The navigation apparatus according to claim 1, wherein when the candidate site data has been deleted from the storage medium, the operating screen is displayed.

5. A vehicle lending system including a user terminal used by a user that desires lending of a vehicle, a server apparatus that receives an application for lending of the vehicle sent from the user terminal, a store terminal disposed in a store that will lend the vehicle, and a navigation apparatus installed in the vehicle, the user terminal and the server apparatus being communicably connected to each other, the server apparatus and the store terminal being communicably connected to each other, and a recording medium being removably installed in the store terminal and the navigation apparatus; wherein the user terminal transmits to the server apparatus, in addition to the application for lending of the vehicle, one or a plurality of items input to the user terminal and related to one or a plurality of locations, the server apparatus creates candidate site data that the navigation apparatus refers to in order to identify the one or a plurality of locations based on the one or a plurality of items, and transmits the candidate site data to the store terminal, and the navigation apparatus, when the recording medium is in a state where storing the candidate site data has been installed, displays a screen for selectively setting an end point of a guidance path from the one or a plurality of locations.

6. The vehicle lending system according to claim 5, wherein the server apparatus selects one or a plurality of related locations that satisfy a predetermined relationship with the one or a plurality of locations, and creates candidate site data including the one or a plurality of related locations in addition to the one or a plurality of locations, and in the navigation apparatus, the end point is selected from the one or a plurality of locations and the one or a plurality of related locations.

7. A vehicle lending method of lending a vehicle in which a navigation apparatus has been installed to a user, the method comprising:

a step of receiving an application for lending of the vehicle sent from a terminal, the application received in a server apparatus communicably connected to the terminal;

a step of, when the server apparatus has received, in addition to the application, one or a plurality of items input to the user terminal and related to one or a plurality of locations, creating candidate site data that the navigation apparatus refers to in order to identify the one or a plurality of locations based on the one or a plurality of items, the candidate site data being created in the server apparatus;

a step of transmitting the candidate site data created in the server apparatus to a terminal disposed in a store where the vehicle will be lent and communicably connected to the server apparatus;

a step of storing the candidate site data received by the store terminal in the navigation apparatus; and a step of allowing the user using the navigation apparatus to selectively set an end point of a guidance path from the one or a plurality of locations based on the candidate site data.

8. The vehicle lending method according to claim 7, wherein the method includes a step of selecting one or a plurality of related locations that satisfy a predetermined positional relationship with the one or a plurality of locations, and creating the candidate site data so as to include the one or a plurality of related locations in addition to the one or a plurality of locations, the candidate site data being created in the server apparatus, and in the navigation apparatus, it is possible to selectively set the end point from the one or a plurality of related locations in addition to the one or a plurality of locations.

9. A combination of a navigation apparatus and an external apparatus, the navigation apparatus being provided in a vehicle and guiding the vehicle along a guidance path, and the external apparatus creating candidate site data to be used in the navigation apparatus; wherein the navigation apparatus comprises a display portion that displays a guidance screen, a removably installed recording medium, and a CPU judging whether or not the candidate site data is stored on the recording medium when the recording medium is installed, when the candidate site data is stored on the recording medium, a selection screen for selectively setting an end point of the guidance path is displayed in the display portion based on the candidate site data, when the end point is set, the navigation apparatus calculates a guidance path that arrives at the end point, the candidate site data includes information related to one or a plurality of locations that are designated in advance before the recording medium is installed, and the end point is selected from the one or a plurality of locations via the selection screen, when the candidate site data is not stored on the recording medium, an operating screen in which the end point is searched for or set by entering characters is displayed in the display portion, and the external apparatus comprises a database related to locations and creates the candidate site data by searching for content stored in the database.

10. The combination according to claim 9, wherein the external apparatus is capable of transmitting the candidate site data to a terminal that is communicably connected to the external apparatus, the recording medium being removably installed in the terminal.

* * * * *